(12) United States Patent
Rice et al.

(10) Patent No.: US 12,049,917 B2
(45) Date of Patent: Jul. 30, 2024

(54) CAPTIVE FASTENER

(71) Applicant: Sky Climber Fasteners LLC, Delaware, OH (US)

(72) Inventors: Donald Wayne Rice, Ripley, NY (US); Raymond Disantis, Willoughby Hills, OH (US)

(73) Assignee: BPC LG 2, LLC, Charlotte, NC (US)

( * ) Notice: Subject to any disclaimer, the term of this patent is extended or adjusted under 35 U.S.C. 154(b) by 232 days.

(21) Appl. No.: 17/689,204

(22) Filed: Mar. 8, 2022

(65) Prior Publication Data

US 2022/0282752 A1   Sep. 8, 2022

Related U.S. Application Data

(60) Provisional application No. 63/158,240, filed on Mar. 8, 2021.

(51) Int. Cl.
  *F16B 39/04*   (2006.01)
  *F16B 35/04*   (2006.01)
  *F16B 41/00*   (2006.01)

(52) U.S. Cl.
  CPC ............ *F16B 41/002* (2013.01); *F16B 35/04* (2013.01)

(58) Field of Classification Search
  CPC ........................................ F16B 39/04
  USPC ................................. 411/347, 348
  See application file for complete search history.

(56) References Cited

U.S. PATENT DOCUMENTS

| | | |
|---|---|---|
| 17,410 A | 5/1857 | Williams |
| 118,684 A | 9/1871 | Bunnell |
| 122,761 A | 1/1872 | Dooley |
| 178,086 A | 5/1876 | Spafford |
| 206,280 A | 7/1878 | Arnam |
| 216,222 A | 6/1879 | Schifferly |
| 229,764 A | 7/1880 | Sipe |
| 238,340 A | 3/1881 | Bunker |
| 270,119 A | 1/1883 | Price |
| 287,003 A | 10/1883 | Cranford |
| 308,266 A | 11/1884 | Lesan |
| 326,927 A | 9/1885 | Wysong |

(Continued)

FOREIGN PATENT DOCUMENTS

DE   29808513   8/1998

OTHER PUBLICATIONS

International Search report and written opinion—PCT/US2022/019281, Jun. 10, 2022; 10pages.

*Primary Examiner* — Flemming Saether
(74) *Attorney, Agent, or Firm* — Dawsey Co., LPA; David J. Dawsey

(57) ABSTRACT

A captive fastener having multiple components selectively biased to improve durability, including a primary body, an actuator, a plurality of locking pins, a biasing system, a bushing, and an actuator biasing member. Application of a predetermined force to an actuator proximal end longitudinally displaces the actuator from an actuator first position to an actuator second position and forces a cam leading edge against a biasing member to retract a pin from an extended position to a retracted position that does not interfere with a thread pattern formed in the fastener. The actuator biasing member returns the actuator to the actuator first position upon removal of the predetermined force allowing the biasing member to bias the pin away from the retracted position.

20 Claims, 26 Drawing Sheets

(56) References Cited

U.S. PATENT DOCUMENTS

| | | | |
|---|---|---|---|
| 348,117 A | 8/1886 | Farber |
| 376,258 A | 1/1888 | Potter |
| 386,624 A | 7/1888 | Clark |
| 401,019 A | 4/1889 | Evans |
| 466,389 A | 1/1892 | Waterhouse |
| 467,617 A | 1/1892 | Gross |
| 470,561 A | 3/1892 | Griffen |
| 478,096 A | 7/1892 | Durben |
| 481,344 A | 8/1892 | Broadley |
| 488,958 A | 12/1892 | Bosmann |
| 517,022 A | 3/1894 | Bourgeois |
| 526,697 A | 10/1894 | Franklin |
| 564,289 A | 7/1896 | Maloney |
| 579,547 A | 3/1897 | Perry |
| 584,157 A | 6/1897 | Gordon |
| 599,783 A | 3/1898 | Hogan |
| 616,419 A | 12/1898 | Howard |
| 721,198 A | 2/1903 | Kellam |
| 733,754 A | 7/1903 | Secor |
| 740,222 A | 9/1903 | Boss |
| 741,601 A | 10/1903 | Whitfield |
| 741,701 A | 10/1903 | O'Conner |
| 746,937 A | 12/1903 | Elsenrath |
| 752,025 A | 2/1904 | Brindle |
| 754,438 A | 3/1904 | Evans |
| 760,812 A | 5/1904 | Smith |
| 762,656 A | 6/1904 | Richardaon |
| 804,803 A | 11/1905 | Garrett |
| 815,497 A | 3/1906 | Watson |
| 816,143 A | 3/1906 | Allen |
| 816,779 A | 4/1906 | Cheek |
| 818,635 A | 4/1906 | McCanse |
| 834,579 A | 10/1906 | Kidney |
| 837,945 A | 12/1906 | Moffet |
| 838,734 A | 12/1906 | Moler |
| 840,390 A | 1/1907 | Smiley |
| 854,800 A | 5/1907 | Cheek |
| 858,889 A | 7/1907 | Morrison |
| 866,451 A | 9/1907 | Foraker |
| 883,691 A | 4/1908 | Bowman |
| 893,066 A | 7/1908 | Fletcher |
| 923,251 A | 6/1909 | Decker |
| 926,568 A | 6/1909 | Huey |
| 947,069 A | 1/1910 | Weinel |
| 957,576 A | 5/1910 | Robinson |
| 973,460 A | 10/1910 | Rank |
| 974,468 A | 11/1910 | Burgert |
| 981,321 A | 1/1911 | Smith |
| 994,726 A | 6/1911 | Dorman |
| 998,290 A | 7/1911 | Hanson |
| 1,006,918 A | 10/1911 | Delamere |
| 1,017,770 A | 2/1912 | Latshaw |
| 1,018,855 A | 2/1912 | Van Ormer |
| 1,019,243 A | 3/1912 | Gandy |
| 1,047,542 A | 12/1912 | Lofland |
| 1,053,604 A | 2/1913 | Hughey |
| 1,075,605 A | 10/1913 | Simon |
| 1,082,211 A | 12/1913 | Phipps |
| 1,086,788 A | 2/1914 | Schum |
| 1,091,889 A | 3/1914 | Mitchell |
| 1,108,866 A | 8/1914 | Messner |
| 1,129,787 A | 2/1915 | Bright |
| 1,158,260 A | 10/1915 | Moerbe |
| 1,162,531 A | 11/1915 | Ward |
| 1,177,780 A | 4/1916 | Kessel |
| 1,193,974 A | 8/1916 | Bastien |
| 1,199,448 A | 9/1916 | Burnett |
| 1,206,330 A | 11/1916 | Howell |
| 1,206,410 A | 11/1916 | Butler |
| 1,208,539 A | 12/1916 | Gilbert |
| 1,210,310 A | 12/1916 | Hickling |
| 1,210,669 A | 1/1917 | Soltesz |
| 1,240,046 A | 9/1917 | Hubener |
| 1,261,646 A | 4/1918 | Taber |
| 1,288,215 A | 12/1918 | Savickis |
| 1,289,867 A | 12/1918 | Moore |
| 1,364,298 A | 1/1921 | Nies |
| 1,387,172 A | 8/1921 | Postle |
| 1,389,927 A | 9/1921 | Ball |
| 1,404,023 A | 1/1922 | Hare |
| 1,454,712 A | 5/1923 | Ellis |
| 1,518,918 A | 9/1924 | Griffith |
| 1,564,700 A | 12/1925 | McGlynn |
| 1,595,213 A | 8/1926 | Neubauer |
| 1,597,667 A | 8/1926 | Blair |
| 1,666,608 A | 4/1928 | Sarazin |
| 1,679,474 A | 4/1928 | Kenton |
| 1,709,539 A | 4/1929 | Poelman |
| 1,719,069 A | 7/1929 | McGlynn |
| 1,722,231 A | 7/1929 | Penney |
| 1,741,234 A | 12/1929 | Henry |
| 1,845,428 A * | 2/1932 | Llewellyn | F16B 39/02 411/929 |
| 1,869,947 A | 8/1932 | Shook |
| 1,968,959 A | 8/1934 | Randall |
| 2,097,169 A | 10/1937 | Wasserbach |
| 2,162,811 A | 6/1939 | Guy |
| 2,318,356 A | 5/1943 | Ball |
| 2,318,473 A | 5/1943 | Earley |
| 2,367,399 A | 1/1945 | Sakson |
| 2,382,166 A | 8/1945 | Martin |
| 2,404,128 A | 7/1946 | Field |
| 2,425,464 A | 8/1947 | George |
| 2,433,138 A | 12/1947 | Marcell |
| 2,564,550 A | 8/1951 | Tichenor |
| 2,718,252 A | 9/1955 | Schuster |
| 2,730,154 A | 1/1956 | Aspey |
| 2,758,625 A | 8/1956 | Poupitcg |
| 2,906,311 A | 9/1959 | Boyd |
| 3,055,015 A | 9/1962 | Silverman |
| 3,145,611 A | 8/1964 | Millheiser |
| 3,149,654 A | 9/1964 | Podell |
| 3,180,390 A * | 4/1965 | Ockert, Jr. | F16B 21/165 411/945 |
| 3,208,493 A | 9/1965 | Holmes |
| 3,263,725 A | 8/1966 | Epstein |
| 3,308,866 A | 3/1967 | Russell |
| 3,390,712 A * | 7/1968 | Mckay | F16B 39/04 411/21 |
| 3,561,516 A * | 2/1971 | Reddy | F16B 41/002 411/347 |
| 3,592,250 A | 7/1971 | Petroshanoff |
| 3,712,356 A | 1/1973 | Petroshanoff |
| 4,069,855 A | 1/1978 | Petroshanoff |
| 4,112,992 A | 9/1978 | Wing |
| 4,119,131 A | 10/1978 | Cosenza |
| 4,232,764 A | 11/1980 | Yamamoto |
| 4,278,120 A | 7/1981 | Hart et al. |
| 4,387,497 A | 6/1983 | Gulistan |
| 4,553,890 A | 11/1985 | Gulistan |
| 4,671,718 A | 6/1987 | Eakin |
| 4,759,671 A | 7/1988 | Duran |
| 4,854,795 A | 8/1989 | Duran |
| 4,911,726 A | 3/1990 | Warkentin |
| 5,056,208 A | 10/1991 | Stafford |
| 5,073,070 A | 12/1991 | Chang |
| 5,074,726 A | 12/1991 | Betchel et al. |
| 5,224,806 A | 7/1993 | Duran |
| 5,226,768 A | 7/1993 | Speer |
| 5,725,344 A | 3/1998 | Petrella |
| 5,931,621 A * | 8/1999 | Griffith | F16B 39/02 411/395 |
| 5,947,668 A | 9/1999 | Thommes |
| 6,015,937 A | 1/2000 | Branemark |
| 6,302,633 B1 | 10/2001 | Poe |
| 6,860,689 B1 | 3/2005 | Attanasio |
| 7,377,735 B2 | 5/2008 | Cosenza et al. |
| 7,462,008 B2 | 12/2008 | Attanasio |
| 7,967,538 B1 | 6/2011 | Coope et al. |
| 8,641,344 B1 | 2/2014 | Avetisian et al. |
| 8,992,149 B2 | 3/2015 | Dixon |
| 10,274,000 B1 | 4/2019 | Bulow |
| 10,385,909 B2 | 8/2019 | Kim |
| 2005/0169728 A1 | 8/2005 | Attanasio |

(56) References Cited

U.S. PATENT DOCUMENTS

2010/0011547 A1  1/2010  Schluep et al.
2019/0257347 A1  8/2019  Phan et al.
2020/0158160 A1  5/2020  Phan et al.

* cited by examiner

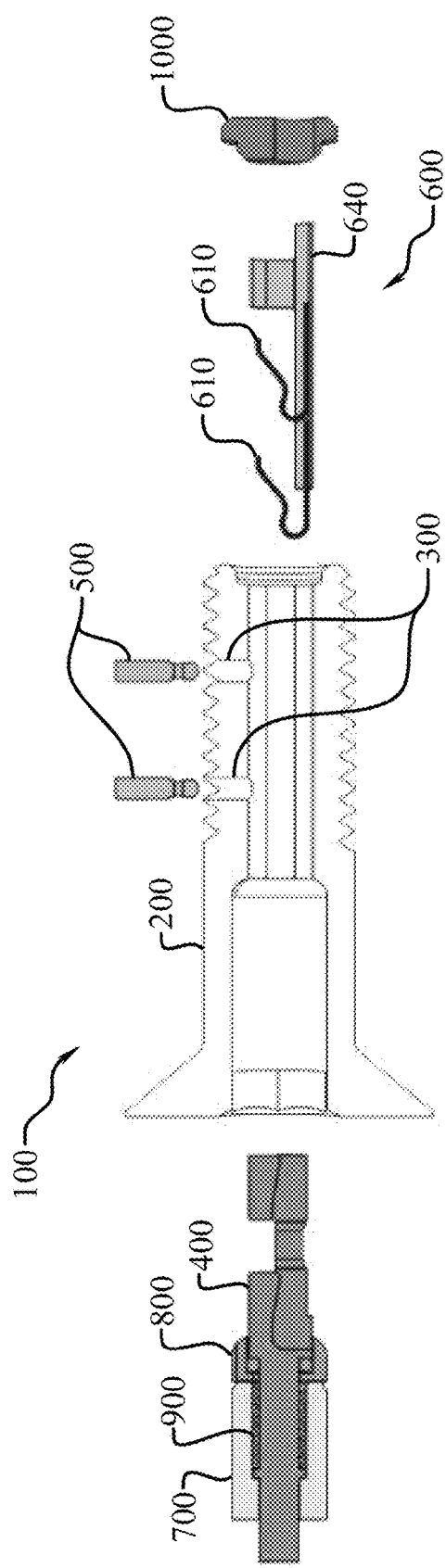
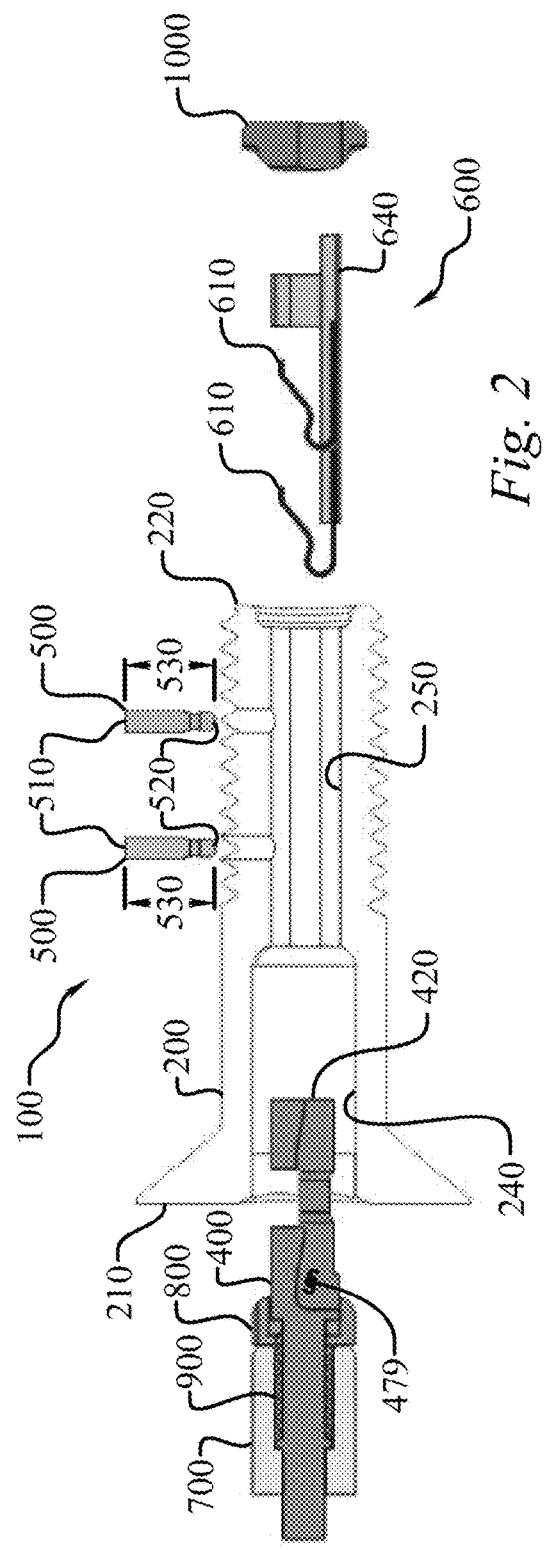

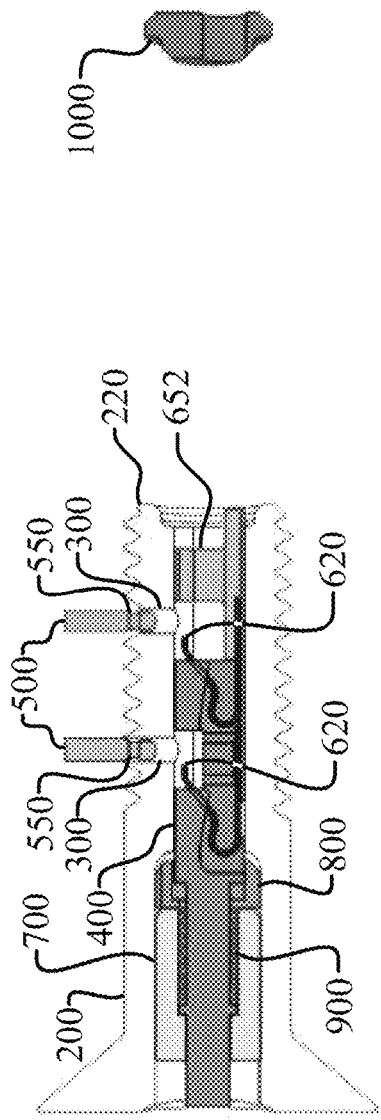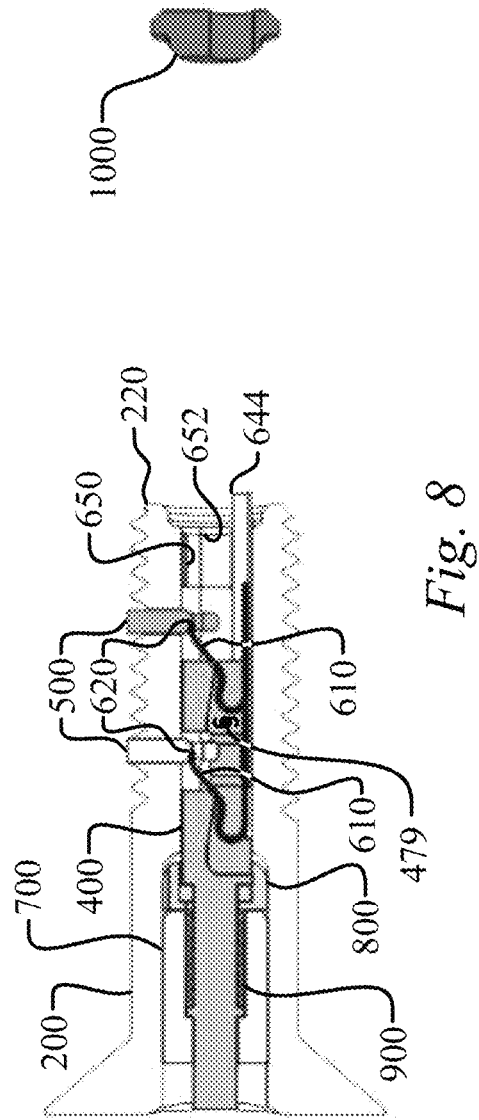

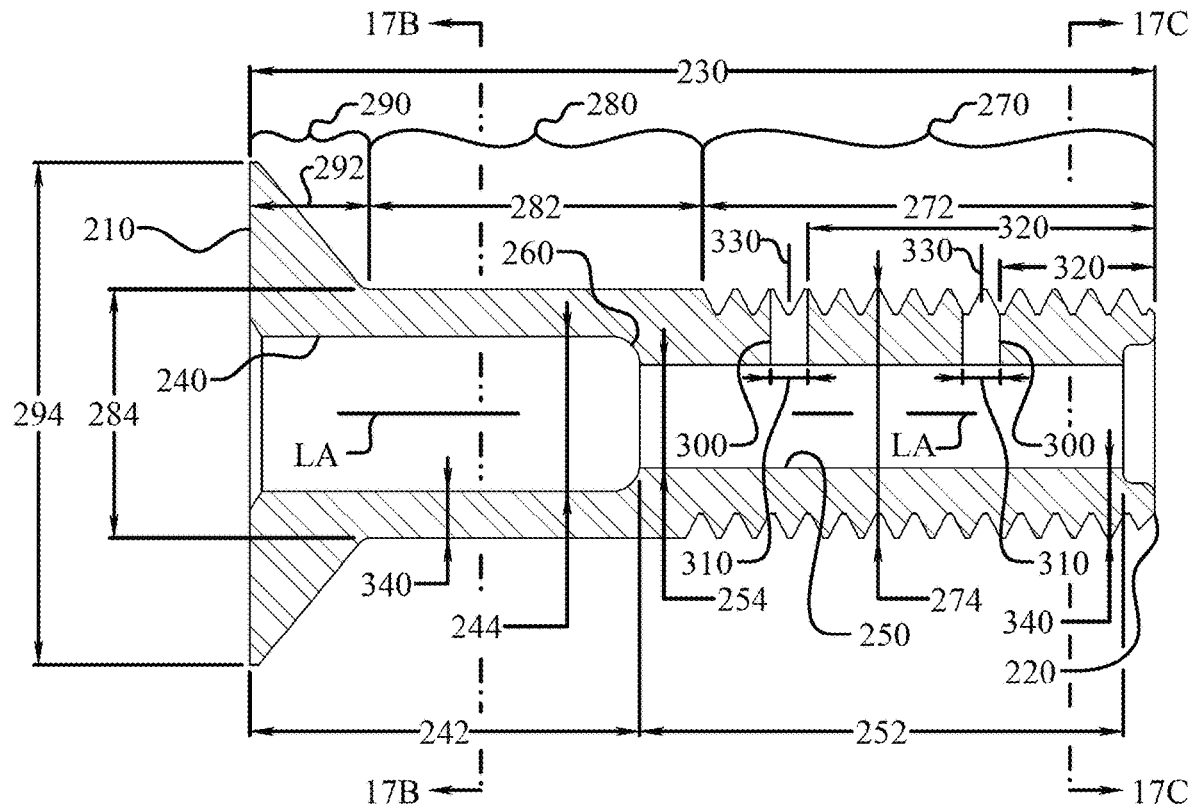
Fig. 17A
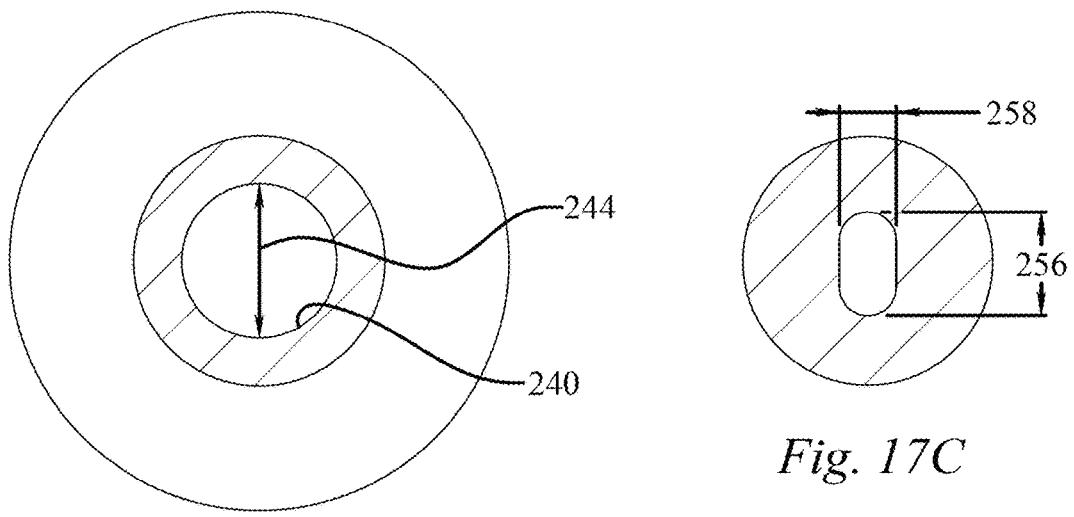
Fig. 17B
Fig. 17C

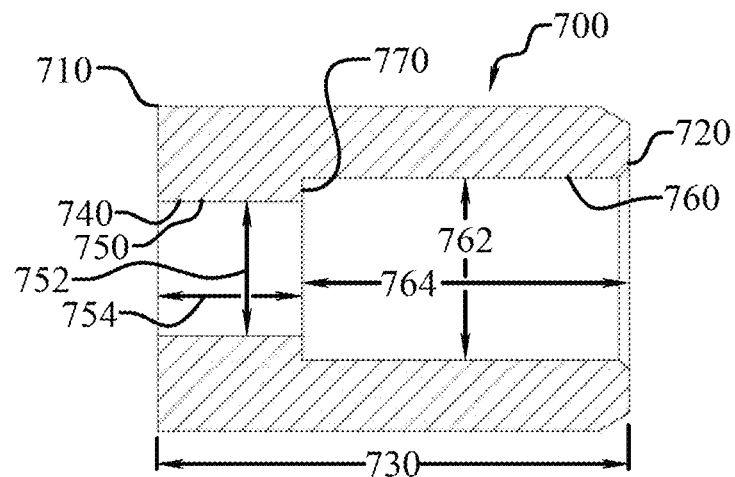
Fig. 37
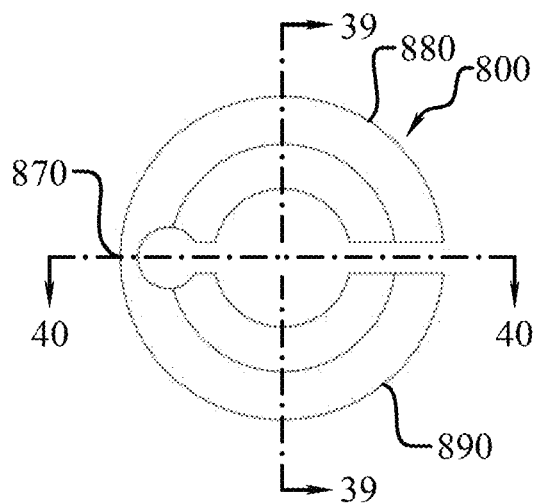
Fig. 38
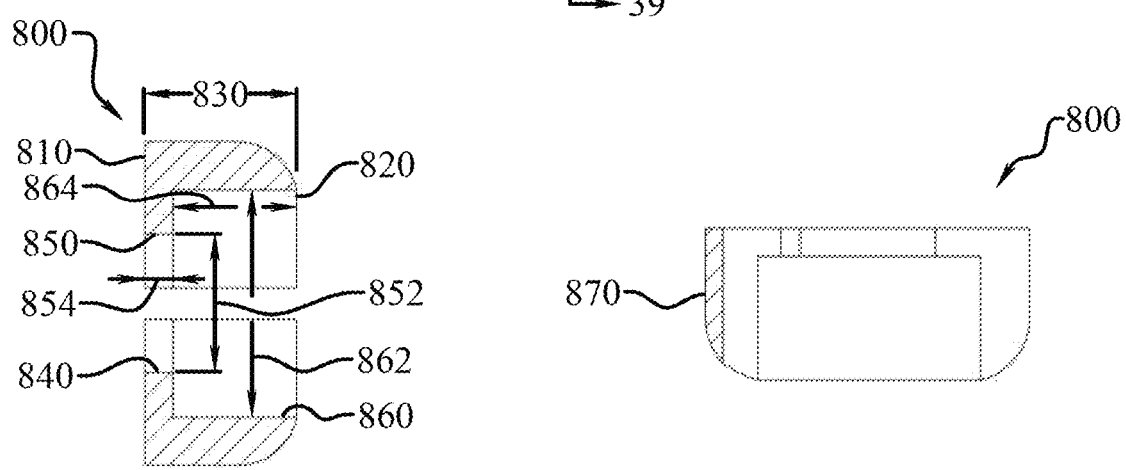
Fig. 39
Fig. 40

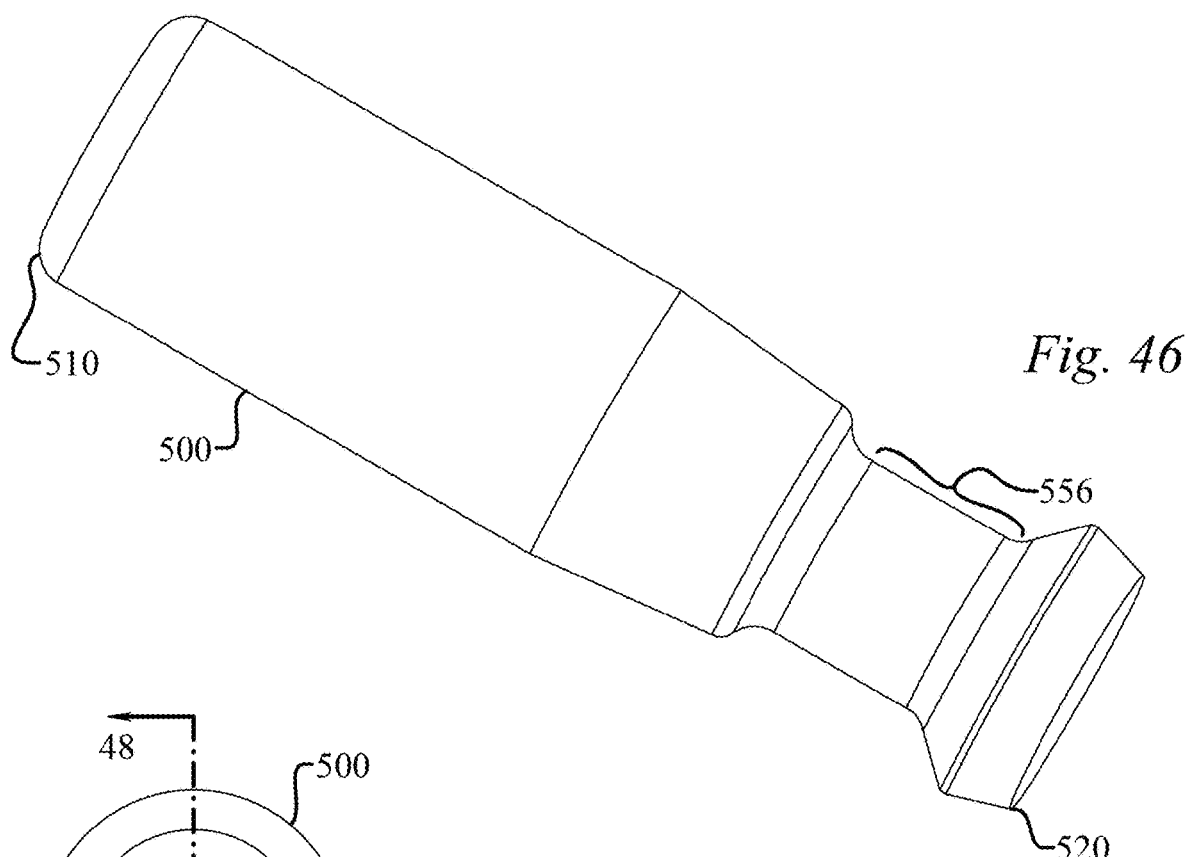
Fig. 46
Fig. 47
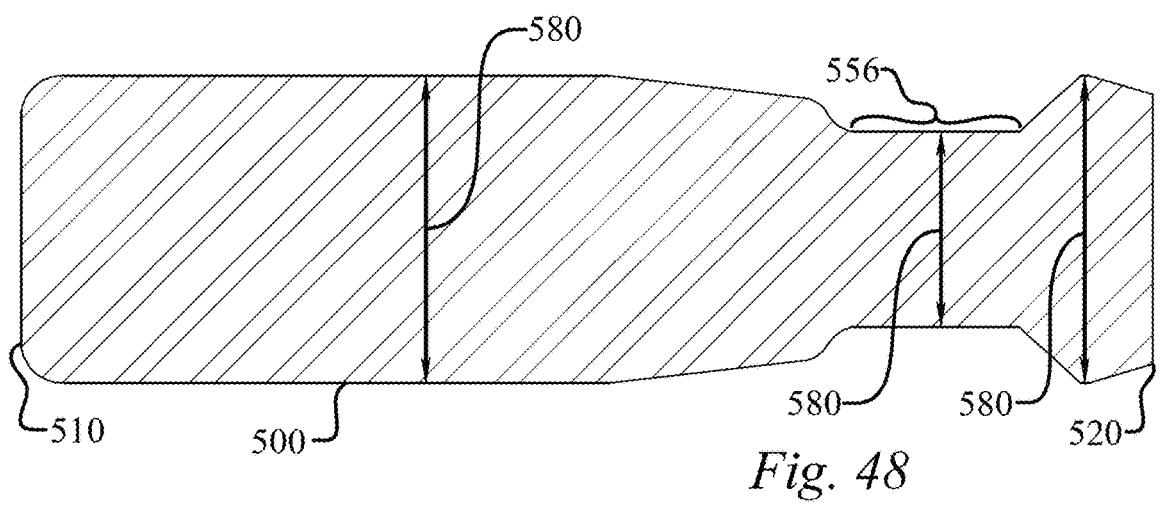
Fig. 48

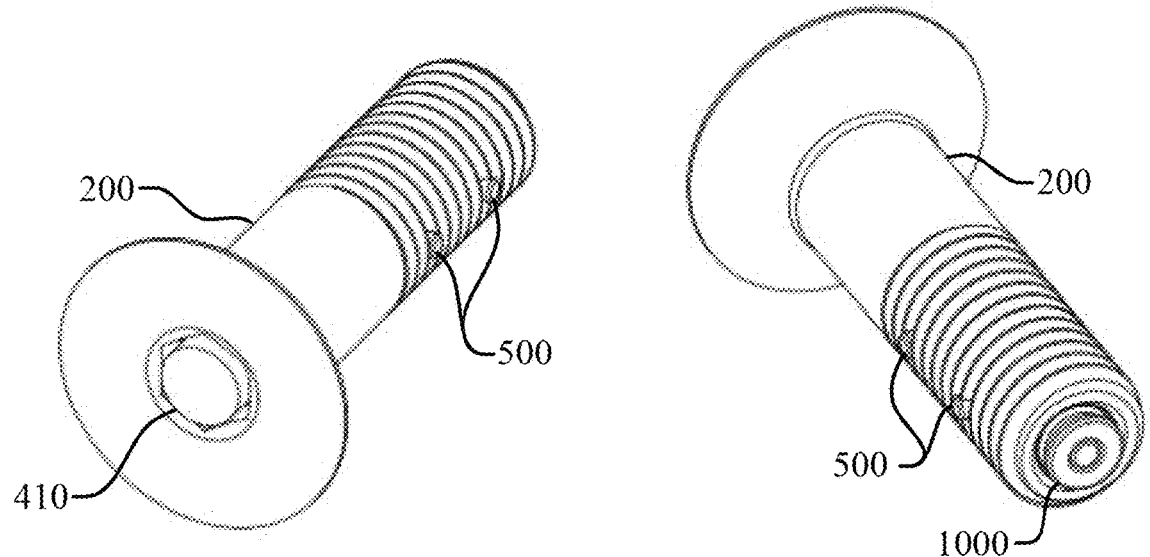
Fig. 49
Fig. 50
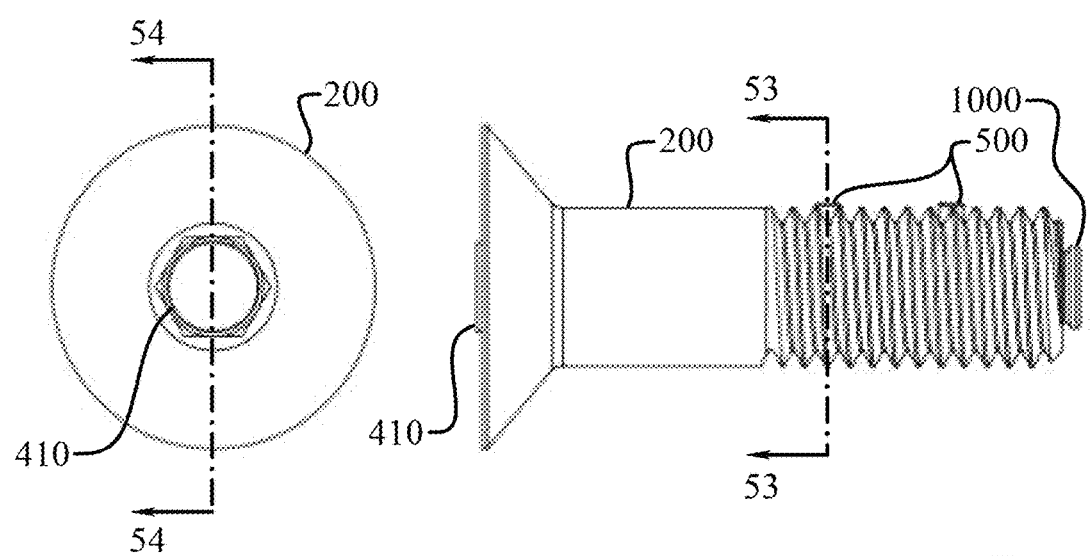
Fig. 51
Fig. 52

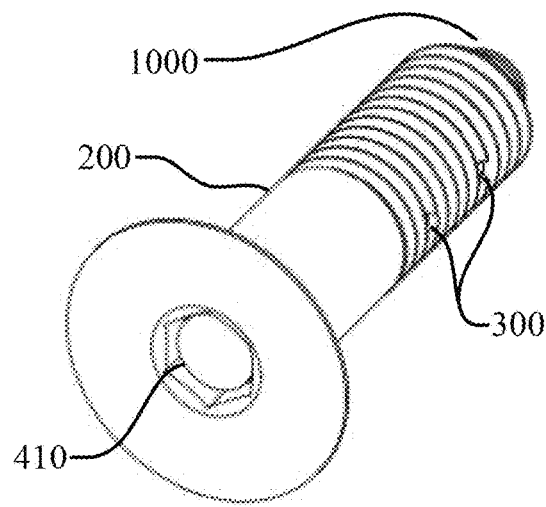
Fig. 55
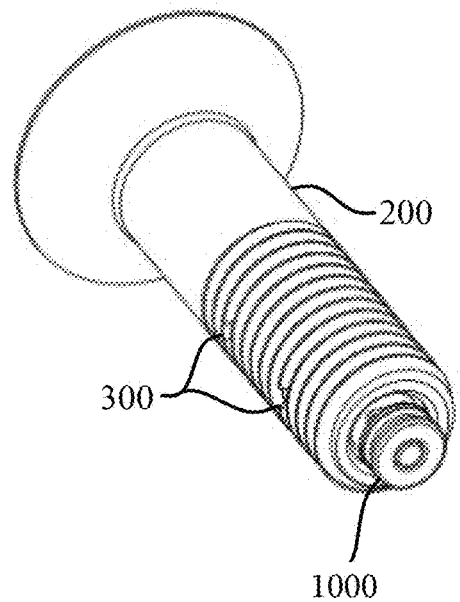
Fig. 56
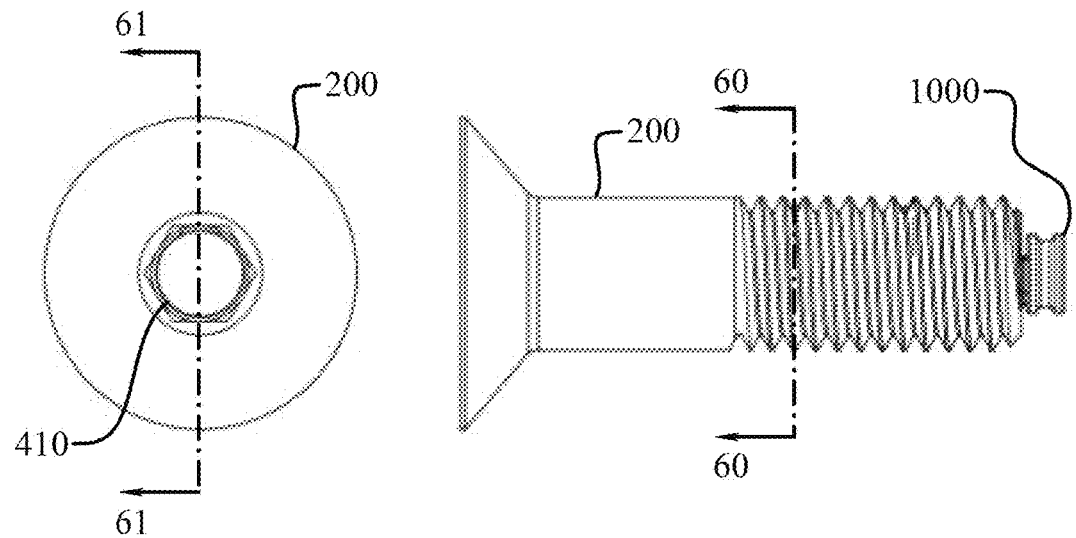
Fig. 57
Fig. 58

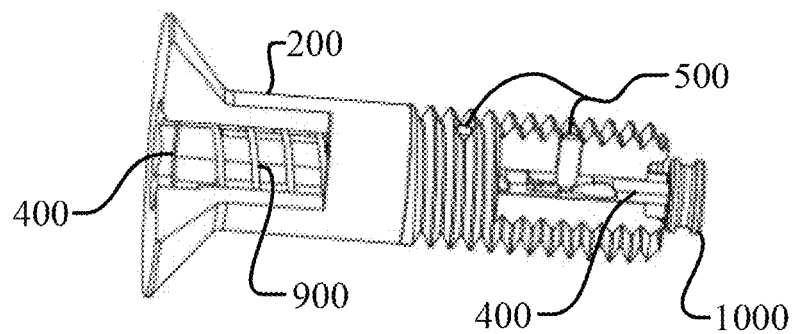
Fig. 59
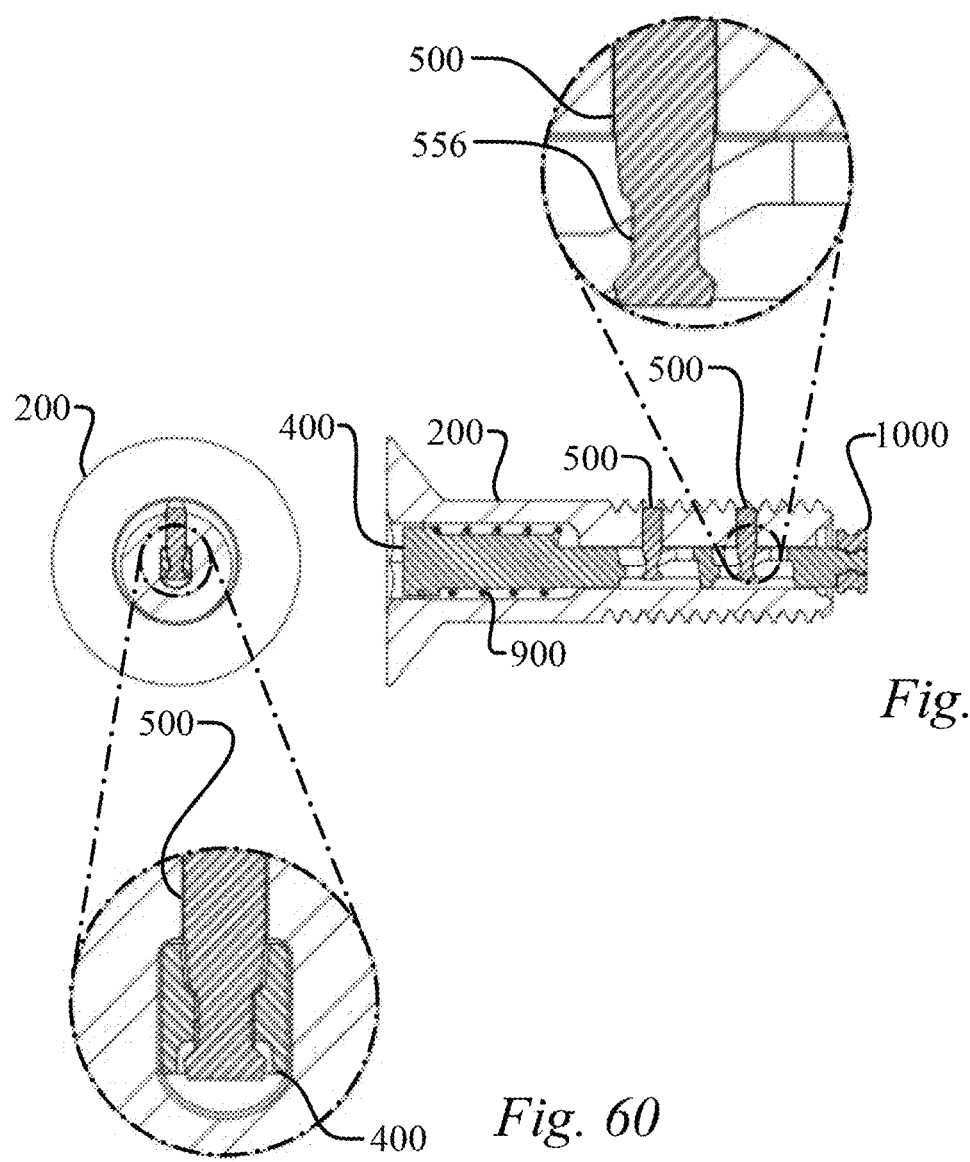
Fig. 61
Fig. 60

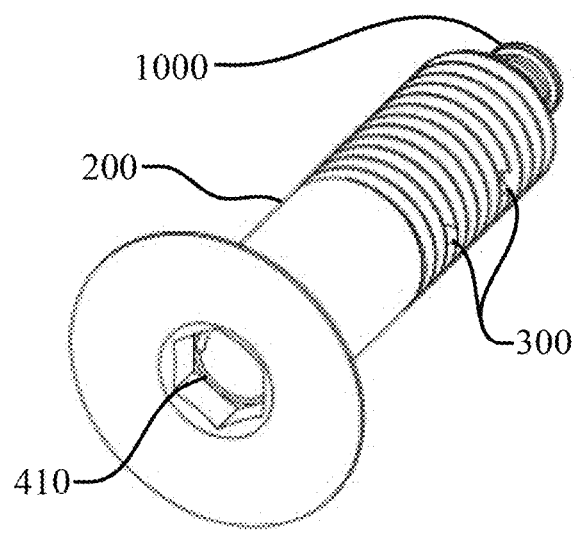
*Fig. 62*
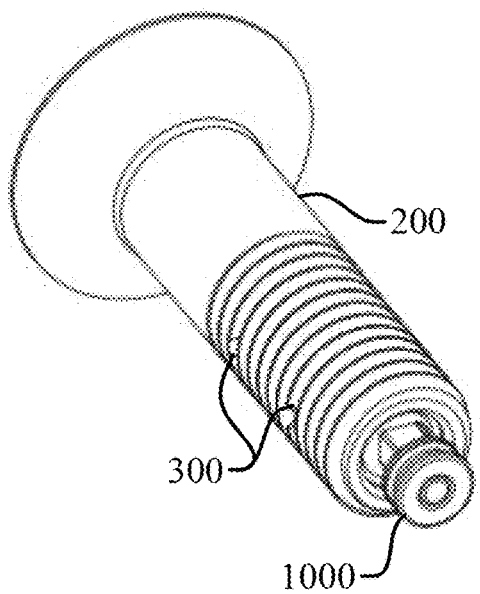
*Fig. 63*
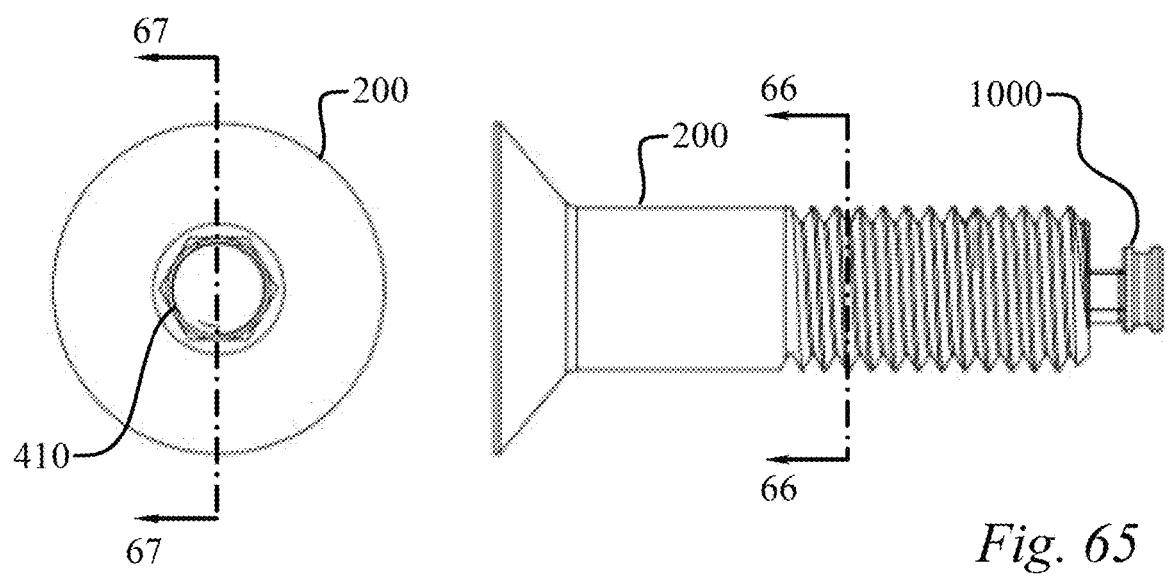
*Fig. 64*
*Fig. 65*

CAPTIVE FASTENER

CROSS-REFERENCE TO RELATED APPLICATIONS

This application claims the benefit of U.S. provisional patent application Ser. No. 63/158,240, filed on Mar. 8, 2021, all of which is incorporated by reference as if completely written herein.

STATEMENT REGARDING FEDERALLY SPONSORED RESEARCH OR DEVELOPMENT

Not applicable.

TECHNICAL FIELD OF THE INVENTION

The present invention relates generally to captive fasteners.

BACKGROUND OF THE INVENTION

The field of captive fasteners has been largely overlooked as fastening systems have advanced over the years.

SUMMARY OF INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations. The instant invention demonstrates such capabilities and overcomes many of the shortcomings of prior methods in new and novel ways. Specifically, the present invention includes a captive fastener having multiple components selectively biased to improve durability, including, in some embodiments, a primary body, an actuator, a plurality of locking pins, a biasing system, a bushing, and an actuator biasing member. Application of a predetermined force to an actuator proximal end longitudinally displaces the actuator from an actuator first position to an actuator second position and forces a cam leading edge against a biasing member to retract a pin from an extended position to a retracted position that does not interfere with a thread pattern formed in the fastener. The actuator biasing member returns the actuator to the actuator first position upon removal of the predetermined force allowing the biasing member to bias the pin away from the retracted position.

BRIEF DESCRIPTION OF THE DRAWINGS

Without limiting the scope of the present invention as claimed below and referring now to the drawings and figures:

FIG. 1 is a cross-section exploded view of an embodiment of a captive fastener;

FIG. 2 is another cross-section exploded view of an embodiment of a captive fastener;

FIG. 7 is another cross-section exploded view of an embodiment of a captive fastener;

FIG. 8 is another cross-section exploded view of an embodiment of a captive fastener;

FIG. 17A is a cross-section view of an embodiment of a captive fastener's primary body;

FIG. 17B is a cross-section view of an embodiment of a captive fastener taken along section line 17B-17B in FIG. 17A;

FIG. 17C is another cross-section view of an embodiment of a captive fastener taken along section line 17C-17C in FIG. 17A;

FIG. 37 is a cross-section view of an embodiment of a captive fastener bushing;

FIG. 38 is a proximal end elevation view of an embodiment of a captive fastener retainer;

FIG. 39 is a cross-section view of an embodiment of a captive fastener retainer taken along section line 39-39 in FIG. 38;

FIG. 40 is a cross-section view of an embodiment of a captive fastener retainer taken along section line 40-40 in FIG. 38;

FIG. 46 is isometric view of an embodiment of a captive fastener locking pin;

FIG. 47 is a proximal end elevation view of an embodiment of a captive fastener locking pin;

FIG. 48 is a cross-section view of an embodiment of a captive fastener locking pin taken along section line 48-48 of FIG. 47;

FIG. 49 is an isometric view of an embodiment of a captive fastener;

FIG. 50 is another isometric view of an embodiment of a captive fastener;

FIG. 51 is an end elevation view of an embodiment of a captive fastener;

FIG. 52 is a side elevation view of an embodiment of a captive fastener;

FIG. 55 is an isometric view of an embodiment of a captive fastener;

FIG. 56 is another isometric view of an embodiment of a captive fastener;

FIG. 57 is an end elevation view of an embodiment of a captive fastener;

FIG. 58 is a side elevation view of an embodiment of a captive fastener;

FIG. 59 is a partially cut-away isometric view of an embodiment of a captive fastener;

FIG. 60 is a cross-section view of an embodiment of a captive fastener taken along section line 60-60 of FIG. 58;

FIG. 61 is a cross-section view of an embodiment of a captive fastener taken along section line 61-61 of FIG. 57;

FIG. 62 is an isometric view of an embodiment of a captive fastener;

FIG. 63 is another isometric view of an embodiment of a captive fastener;

FIG. 64 is an end elevation view of an embodiment of a captive fastener;

FIG. 65 is a side elevation view of an embodiment of a captive fastener;

Figure 3:
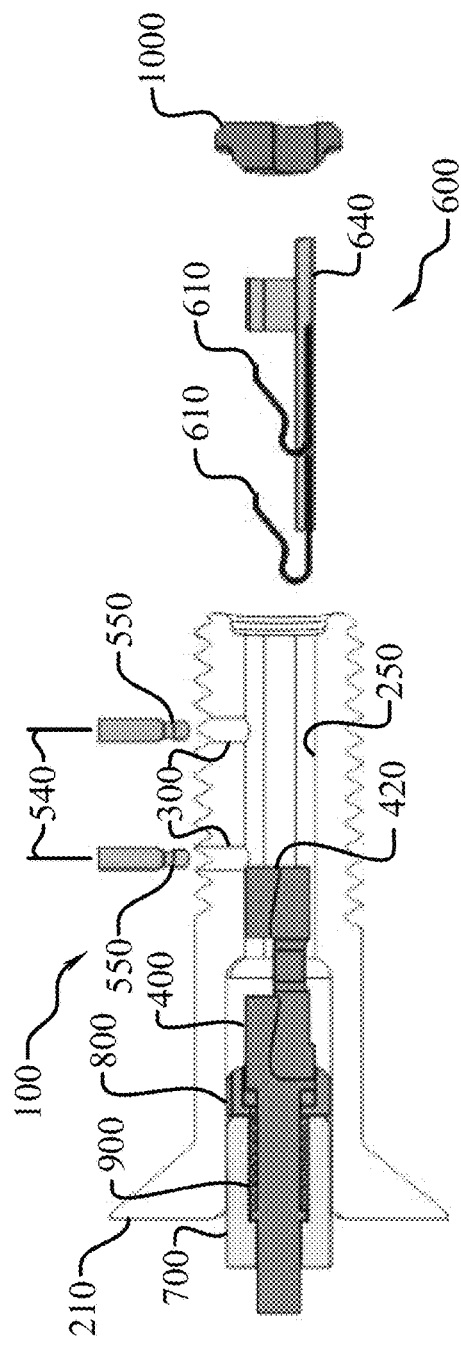
FIG. 3 is another cross-section exploded view of an embodiment of a captive fastener.
Figure 4:
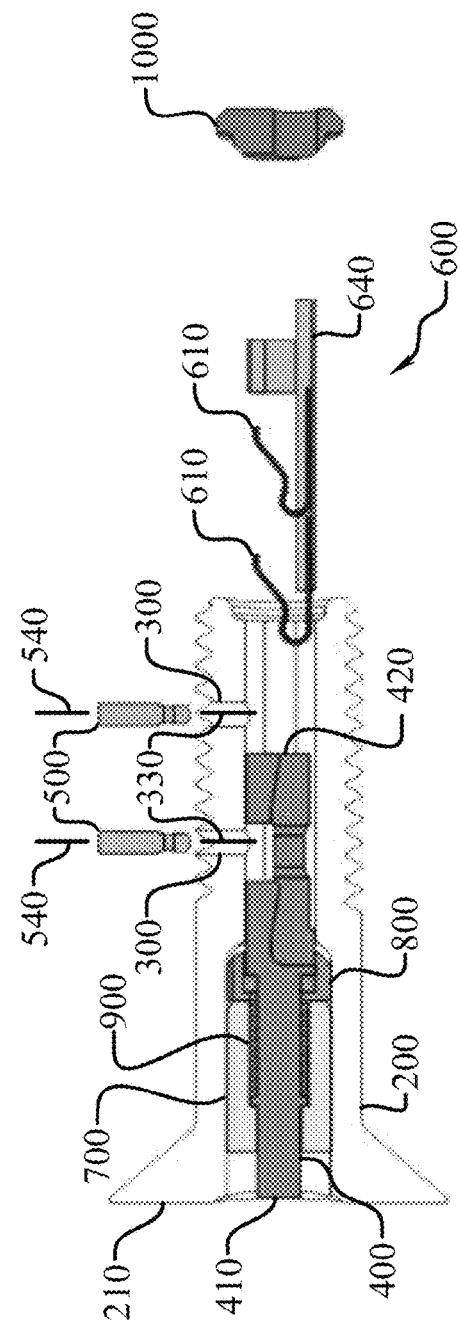
FIG. 4 is another cross-section exploded view of an embodiment of a captive fastener.
Figure 5:
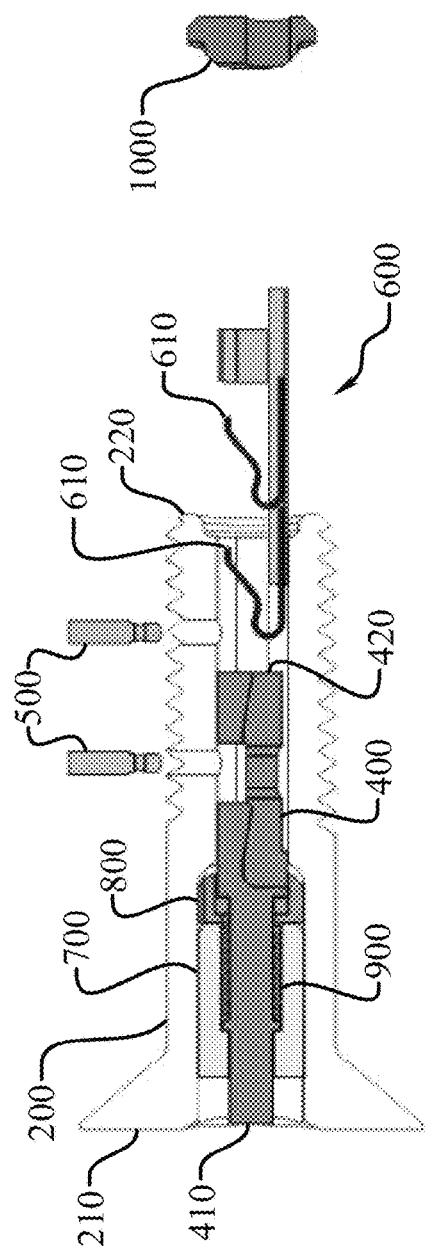
FIG. 5 is another cross-section exploded view of an embodiment of a captive fastener.
Figure 6:
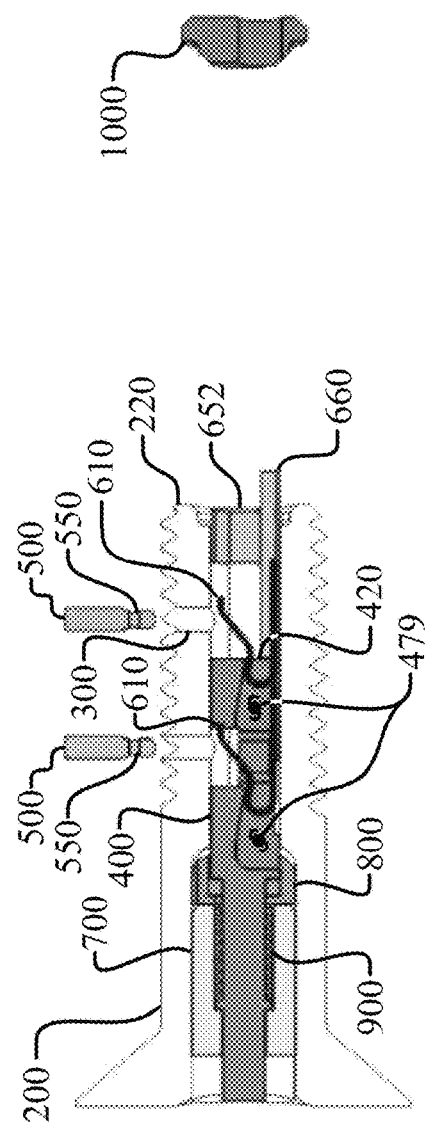
FIG. 6 is another cross-section exploded view of an embodiment of a captive fastener.
Figure 9:
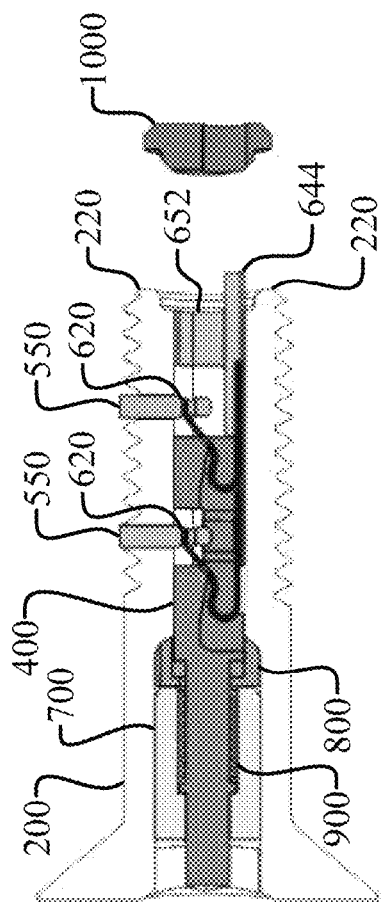
FIG. 9 is another cross-section exploded view of an embodiment of a captive fastener.
Figure 10:
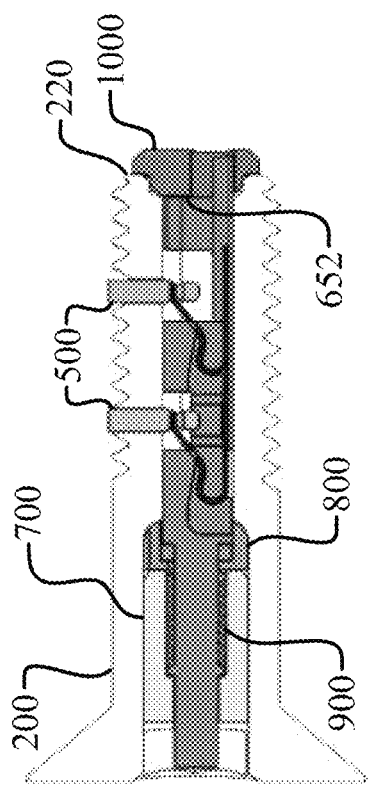
FIG. 10 is a cross-sectional view of an embodiment of a captive fastener.
Figure 11:
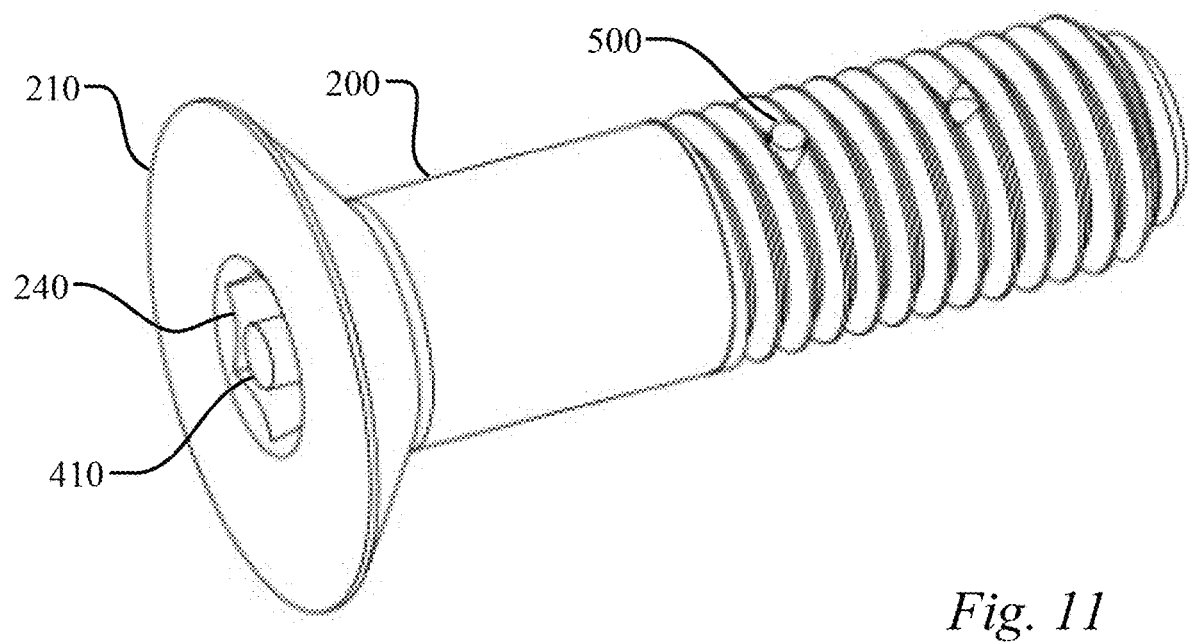
FIG. 11 is an isometric view of an embodiment of a captive fastener, having an activator in a first position state.

These illustrations are provided to assist in the understanding of the exemplary embodiments of blind fasteners as described in more detail below and should not be construed as unduly limiting the specification. In particular, the relative spacing, positioning, sizing and dimensions of the various elements illustrated in the drawings may not be drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

Figure 71:
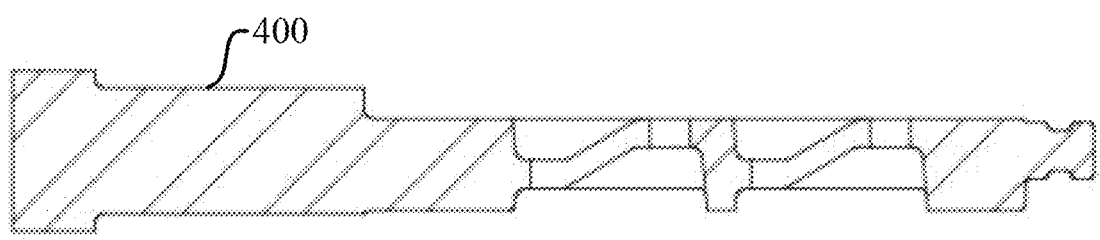
FIG. 71 is a cross-section view of an embodiment of a captive fastener cam taken along section line 71-71 of FIG. 70.

As seen in the associated figures, the captive fastener (100) may include a primary body (200), often abbreviated PB, configured to receive an actuator (400), at least one locking pin (500), and in some embodiments, such as FIGS. 1-71, a biasing system (600) cooperating with the actuator (400) and the locking pin (500) to control the movement of the locking pin (500), whereas other embodiments, such as FIGS. 46-71, forego a biasing system (600) in favor of the actuator (400) directly cooperating with the locking pin (500). Some embodiments may further include a bushing (700), a retainer (800), an actuator biasing member (900), and/or a cap (1000), as seen in FIG. 1.

In FIGS. 1-10 the various components are shown in a series of assembly views with the components advancing into their final positions and relationships within the assembled captive fastener (100). The actuator (400), the bushing (700), the retainer (800), and the actuator biasing member (900) are shown on the left side of FIGS. 1-10 and advancing into position through a PB proximal end (210). The biasing system (600) and the cap are shown on the right side of FIGS. 1-10 and advancing into position through, or attached to, a PB distal end (220). The locking pins (500) are shown above the primary body (200) and advancing downward into position through a pin bore (300).

The primary body (200) includes at least one internal bore, such as the PB proximal bore (240) and/or the PB distal bore (250), as seen in FIGS. 2 and 17A. The primary body (200) has a PB proximal end (210), a PB distal end (220), and a PB length (230). The PB proximal bore (240) extends into the primary body (200) from the PB proximal end (210), and may extend partially through the PB length (230), or the entire PB length (230). Similarly, the PB distal bore (250) extends into the primary body (200) from the PB distal end (220), and may extend partially through the PB length (230), or the entire PB length (230). Thus, the primary body (200) has a PB sidewall thickness (340), as seen in FIG. 17A.

In embodiments, such as those illustrated in FIGS. 2 and 17A, having a PB proximal bore (240) in communication with a PB distal bore (250) to create a bore throughout the entire PB length (230), the PB proximal bore (240) has a PB proximal bore length (242), a PB proximal bore dimension (244), and a PB proximal bore transverse cross-sectional shape. Likewise, the PB distal bore (250) has a PB distal bore length (252), a PB distal bore dimension (254), and a PB distal bore transverse cross-sectional shape. With reference to FIG. 17A, the transverse cross-sectional shapes mentioned are taken in a plane perpendicular to a longitudinal axis (LA) of either the PB proximal bore (240) or the PB distal bore (250), or both when their longitudinal axis (LA) are aligned, as in the illustrated embodiments and section lines 17B-17B and 17C-17C. When the transverse cross-sectional shapes mentioned are not identical, a PB bore transition (260) separates the PB proximal bore (240) and the PB distal bore (250).

In one embodiment at least one of the PB proximal bore transverse cross-sectional shape and the PB distal bore transverse cross-sectional shape is non-circular, while in another embodiment at least one is circular and one is non-circular, and in still a further embodiment the PB proximal bore transverse cross-sectional shape is circular, as seen in FIG. 17B, and the PB distal bore transverse cross-sectional shape is non-circular, as seen in FIG. 17C. In the embodiment of FIG. 17C the PB distal bore (250) has a major dimension (256) and a minor dimension (258), while the PB proximal bore dimension (244) of the PB proximal bore (240), seen in FIG. 17B, is a constant diameter.

The primary body (200) has at least one pin bore (300) extending from the exterior surface to at least one internal bore, such as the PB proximal bore (240) and/or the PB distal bore (250). The pin bore (300) has a pin bore dimension (310), as seen in FIG. 17A. The pin bore (300) has a pin bore axis (330). In embodiments in which the pin bore (300) has a circular cross-sectional shape, in a plane perpendicular to the pin bore axis (330), the pin bore dimension (310) is simply the diameter, however the cross-sectional shape may be shapes other than circular, including, but not limited to, triangular, square, pentagonal, or any polygon shape, as well as non-circular shapes incorporating one or more curved sections. In such situations the pin bore dimension (310) is a maximum dimension of the pin bore (300) within a cross-section perpendicular to the pin bore axis (300), unless noted otherwise. The pin bore (300) has a pin bore length that corresponds to the PB sidewall thickness (340).

The pin bore (300) is located a pin bore offset (320) distance from the PB distal end (220), as seen in FIG. 17A, and measured parallel to the longitudinal axis (LA). While the illustrated pin bore axis (330) is perpendicular to the longitudinal axis (LA), the pin bore axis (330) may be pitched toward the PB distal end (220) such that an axis angle between the pin bore axis (330) and the longitudinal axis (LA) is acute, and is at least 45 degrees in one embodiment, and at least 60, 75, and 80 degrees is further embodiments. Similarly, the pin bore axis (330) may be pitched toward the PB proximal end (210) such that an axis angle between the pin bore axis (330) and the longitudinal axis (LA) is acute, and is at least 45 degrees in one embodiment, and at least 60, 75, and 80 degrees is further embodiments. In embodiments having multiple pin bores (300), they may be radially aligned, as in both in the 12 o'clock position in a plane perpendicular to the longitudinal axis (LA) as in FIG. 17A, or they may be radially offset. One such radially offset embodiment has pin bores (300) radially offset by 180 degrees, such as one located at a 12 o'clock position and one located at a 6 o'clock position; while another embodiment has pin bores (300) radially offset by 90 degrees, such as one located at a 12 o'clock position and one located at a 3 o'clock position. An even further embodiment has at least two pin bores (300) that are radially offset by no more than 45 degrees, such as one located at a 12 o'clock position and one located at the 1:30 position, or therebetween.

With reference again to FIG. 17A, the primary body (200) may include a PB threaded region (270), a PB shank region (280), and/or a PB head region (290). The PB threaded region (270) has a PB threaded region length (272) and a PB threaded region dimension (274). The PB shank region (280) has a PB shank region length (282) and a PB shank region dimension (284). The PB head region (290) has a PB head region length (292) and a PB head region dimension (294). The PB threaded region dimension (274) is a maximum exterior dimension of the PB threaded region (270) within a cross-section perpendicular to the longitudinal axis (LA), unless noted otherwise, which in circular profiles is simply a diameter; and this is also true for the PB shank region dimension (284) and the PB head region dimension (294), and is intended to make it explicit that this disclosure is not limited to round cross-sectional profiles characterized by a diameter, and is true to all "dimension" elements contained herein.

Now turning attention to the actuator (400), shown separately in FIGS. 18-24 and in combination with additional elements in FIGS. 1-16, 41-43, and 46-71, the actuator (400) has an actuator proximal end (410), an actuator distal end (420), and an actuator length (430). The actuator (400) is received within the primary body (200) and configures to move longitudinally between at least two positions and thereby ultimately resulting in the movement of the at least one locking pin (500). In the embodiments of FIGS. 1-45 the movement of the actuator (400) engages a biasing system (600) that ultimately moves the locking pin (500), whereas in the embodiments of FIGS. 46-71 the actuator (400) directly contacts the locking pin (500) and controls its movement.

Figure 14:
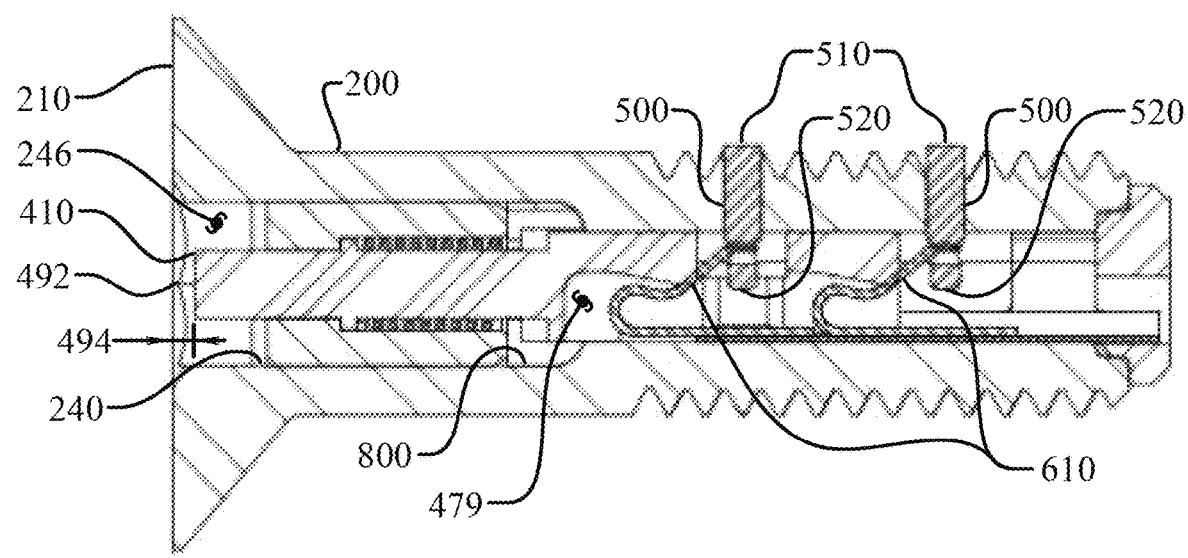
FIG. 14 is a cross-section view of an embodiment of a captive fastener, having an activator in a first position state.
Figure 18:
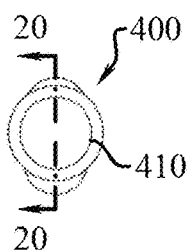
FIG. 18 is a proximal end elevation view of an embodiment of a captive fastener actuator.
Figure 19:
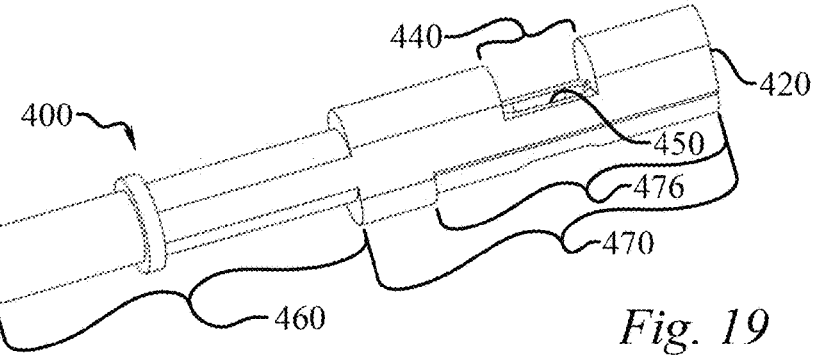
FIG. 19 is an isometric view of an embodiment of a captive fastener actuator.
Figure 20:
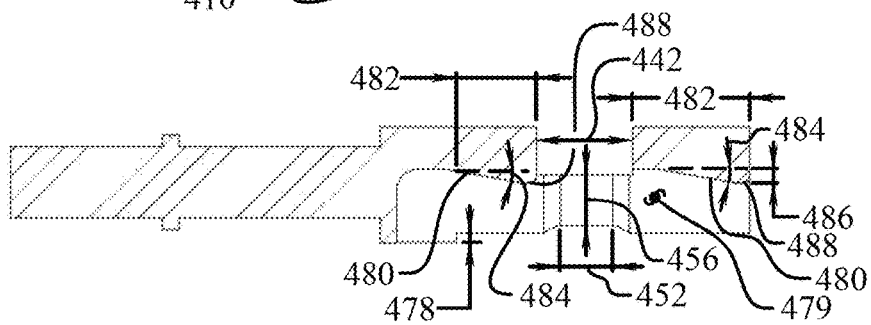
FIG. 20 is a cross-sectional view of an embodiment of a captive fastener actuator taken along section line 20-20 in FIG. 18.
Figure 21:
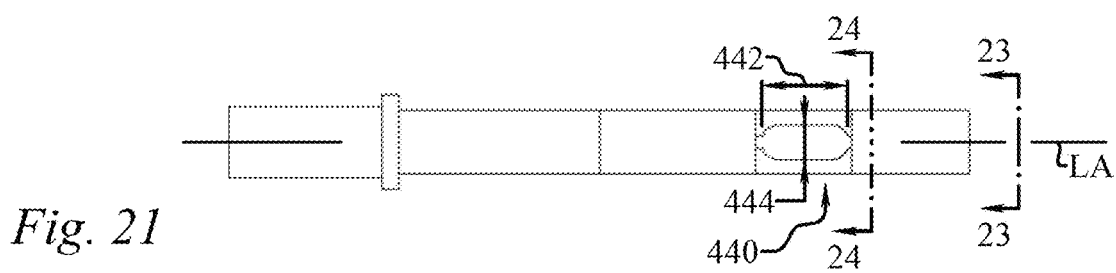
FIG. 21 is a top plan view of an embodiment of a captive fastener actuator.

Focusing first on the embodiments of FIGS. 1-45, and specifically with reference to FIGS. 19-21, the actuator (400) may include a travel opening (440) having a travel opening length (442) and a travel opening width (444). The travel opening (440) allows the actuator to move longitudinally relative to the longitudinally stationary locking pin (500), such as movement from the position shown in FIG. 12 to that shown in FIG. 14. The actuator (400) may also include a retraction slot (450) having a retraction slot length (452), a retraction slot width (454), and a retraction slot depth (456), as seen best in FIGS. 19, 20, and 22. The retraction slot (450) provides an additional region to accept a distal end (520) of the locking pin (500) when the locking pin (500) is moved toward, and into, a retracted position (570), as seen in FIGS. 14, 15, and 16.

Figure 22:
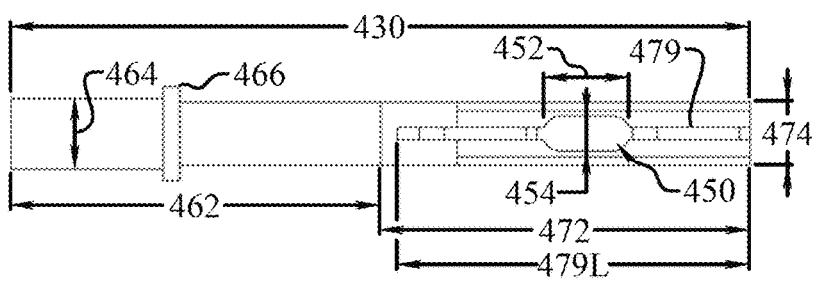
FIG. 22 is a bottom plan view of an embodiment of a captive fastener actuator.
Figure 23:
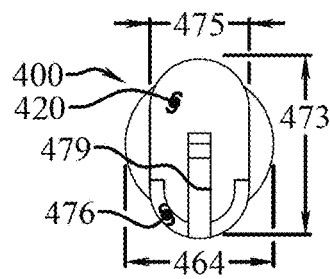
FIG. 23 is a distal end elevation view of an embodiment of a captive fastener actuator.
Figure 24:
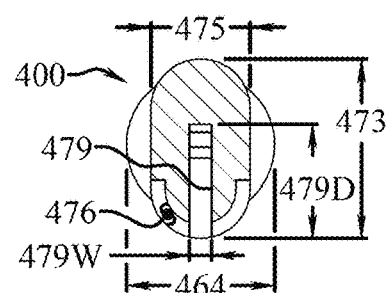
FIG. 24 is a cross-section view of an embodiment of a captive fastener actuator taken along section line 24-24 in FIG. 21.

The actuator (400) may include an actuator proximal portion (460), having an actuator proximal portion transverse cross-sectional shape, and an actuator distal portion (470), having an actuator distal portion transverse cross-sectional shape. The actuator proximal portion (460) has an actuator proximal portion length (462), an actuator proximal portion dimension (464), and may include a stop (466) in some embodiments, as seen in FIG. 22. The actuator distal portion (470) has an actuator distal portion length (472), an actuator distal portion dimension (474), and may include a recess (476) having a recess depth (478), as seen in FIGS. 19 and 22, and/or a biasing member pathway (479), best seen in FIGS. 22-24 followed by FIG. 20. In fact, most of the vertical cross-sectional drawings taken along the longitudinal axis (LA) pass through the biasing member pathway (479), such as FIGS. 1-10, 12, 14, 15, and 20, as well as the actuator distal end (420) view of FIG. 23, and referenced in FIG. 20.

Figure 15:
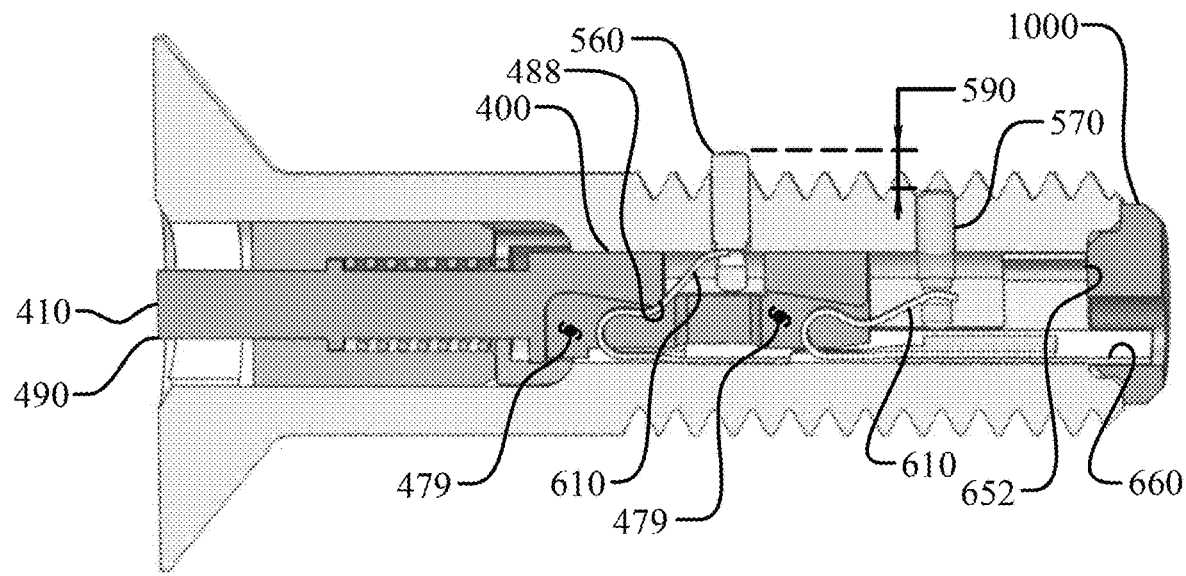
FIG. 15 is a cross-section view of an embodiment of a captive fastener, illustrating the locking pins in two different positional states.
Figure 16:
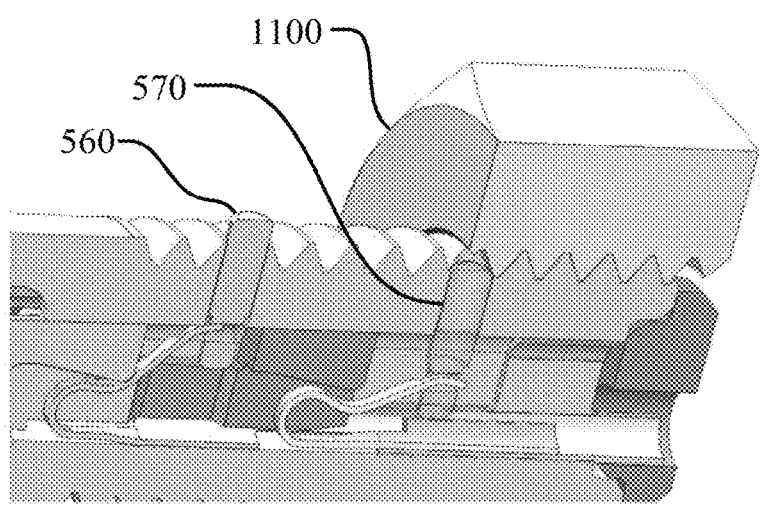
FIG. 16 is a cross-section isometric view of an embodiment of a captive fastener and nut.

The recess (476) facilitates a portion of the biasing system (600), specifically biasing member (610) or biasing member housing (640), seen best in FIGS. 15 and 16. The biasing member pathway (479) allows relative motion of the actuator (400) and the biasing system (600) via a portion of the biasing system (600) fitting within the biasing member pathway (479). In fact, FIG. 6 of the assembly series shows the biasing member (610) passing the actuator distal end (420) and entering the biasing member pathway (479). FIG. 8 illustrates an embodiment in which the biasing member (610) nearest the PB distal end (220) is partially within the biasing member pathway (479), while a biasing member (610) nearest the PB proximal end (210) is entirely within the biasing member pathway (479).

With reference to FIGS. 18-19, the transverse cross-sectional shapes mentioned are taken in a plane perpendicular to a longitudinal axis (LA) of either the PB proximal bore (240) or the PB distal bore (250), or both when their longitudinal axis (LA) are aligned. In one embodiment at least one of the actuator proximal portion transverse cross-sectional shape and the actuator distal portion transverse cross-sectional shape is non-circular, while in another embodiment at least one is circular and one is non-circular, and in still a further embodiment the actuator proximal portion transverse cross-sectional shape is circular and the actuator distal portion transverse cross-sectional shape is non-circular, as seen in FIGS. 18-19 and 23-24. In the embodiment of FIG. 18-24 the actuator distal portion (470) has a major dimension (473) and a minor dimension (475), while the actuator proximal portion (460) is a constant diameter. Referring now to the cross-section of FIG. 20, the actuator (400) may include at least one cam (480), which may have a cam length (482), a cam angle (484), a cam drop (486), and a cam leading edge (488). In this particular embodiment there are two cams (480) that are formed in the biasing member pathway (479), with one having the cam leading edge (488) at a wall of the travel opening (440), and the other having the cam leading edge (488) at the actuator distal end (420). During operation the actuator (400) is displaced from an actuator first position (490), such as that seen in FIG. 12, to an actuator second position (492), such as that seen in FIG. 14, thereby establishing an actuator position differential (494) that is the travel distance along the longitudinal axis (LA) between the actuator first position (490) and the actuator second position (492). In the embodiment illustrated in FIGS. 11-12, the actuator proximal end (410) is aligned with the PB body proximal end (210), while in the actuator first position (490), until a tool is forced into the PB proximal bore (240) and thereby moving the actuator (400) to the actuator second position (492), seen in FIGS. 13-14.

Figure 25:
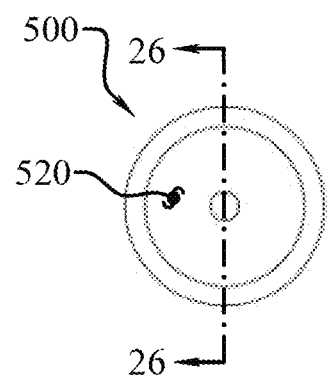
FIG. 25 is a cross-section view of a locking pin taken along section line 26-26 in FIG. 25.
Figure 26:
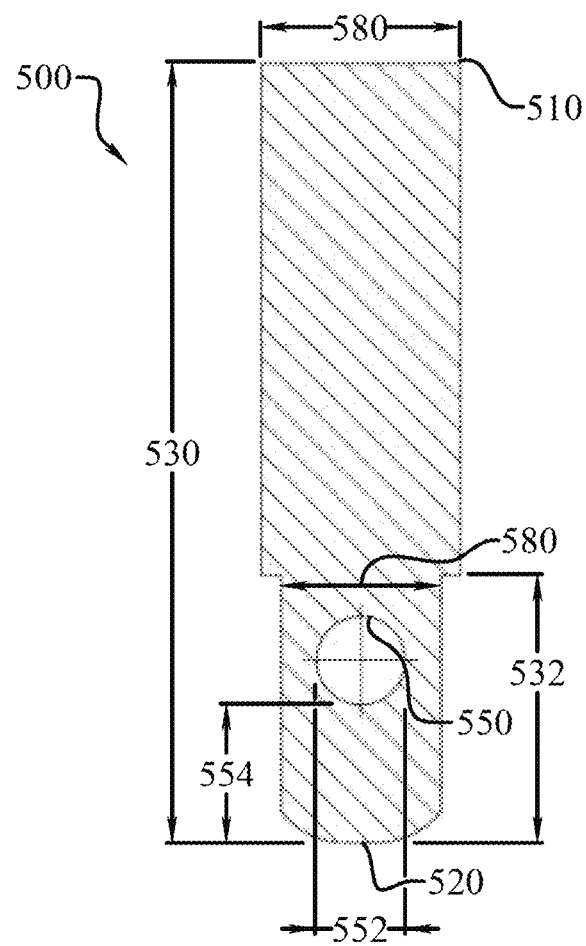
FIG. 26 is a cross-section taken along section line 26-26 in FIG. 25.
Figure 27:
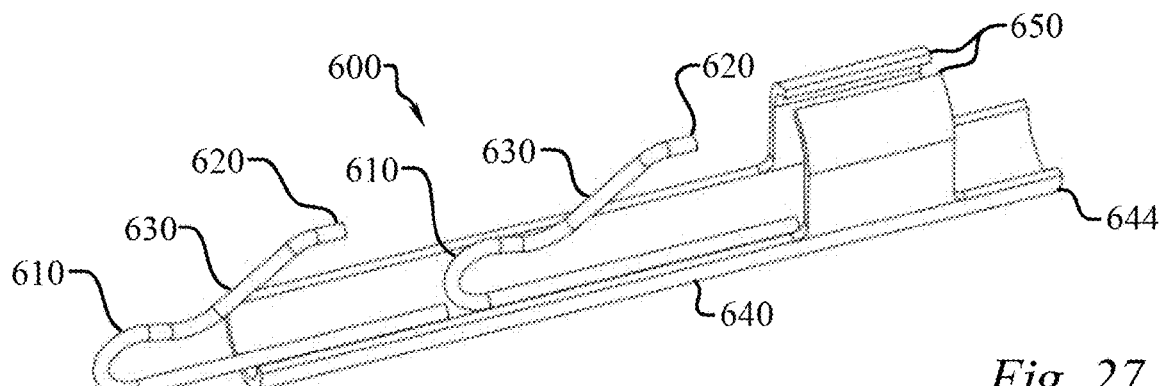
FIG. 27 is an isometric view of an embodiment of a captive fastener biasing system.
Figure 28:
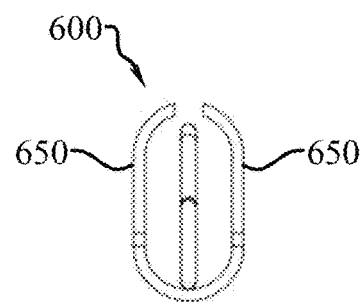
FIG. 28 is an end elevation view of an embodiment of a captive fastener biasing system.

Now referring back to FIGS. 1-2, the locking pin (500) has a pin proximal end (510) and a pin distal end (520), thereby defining a pin length (530). As seen in FIG. 3, each locking pin (500) has a pin axis (540), which is the longitudinal axis of the pin (500), and may include a receiver (550). An embodiment of a locking pin (500) is shown in FIGS. 25-26. The pin (500) has a pin dimension (580), which is the largest dimension in a plane perpendicular to the pin axis (540), which is simply the diameter in the case of a round pin (500), however the cross-sectional shape may be shapes other than circular, including, but not limited to, triangular, square, pentagonal, or any polygon shape, as well as non-circular shapes incorporating one or more curved sections. In such situations the pin dimension (580) is a maximum dimension of the pin (500) within a cross-section perpendicular to the pin axis (540), unless noted otherwise.

The receiver (550) may be an indentation, projection, bore, or necked region designed to cooperate with a portion of the biasing system (600), or the actuator (400) as in the embodiments of FIGS. 46-71. The embodiments of FIGS. 1-45, and specifically FIG. 26, illustrate a receiver (550) having a receiver dimension (552) and a receiver offset (554), which is the shortest distance from the pin distal end (520) to a portion of the receiver (550). In the illustrated embodiment the receiver (550) is a round through-bore and therefore the receiver dimension (552) is simply the diameter of the bore, however the receiver (550) is not limited to being round and in such non-round embodiments the receiver dimension (552) is the largest dimension. As seen in FIG. 26, some embodiments have a distinct region extending from the pin distal end (520) and characterized by a different cross-sectional shape than the rest of the pin (500) or simply a region with a distinctly different pin dimension (580), with the region identified by a distal portion length (532). The embodiments of FIGS. 46-71 have a receiver (550) in the form of a neck (556) that directly cooperates with the actuator (400), although the neck (556) may be configured to cooperate with the biasing system (600) as well.

Figure 12:
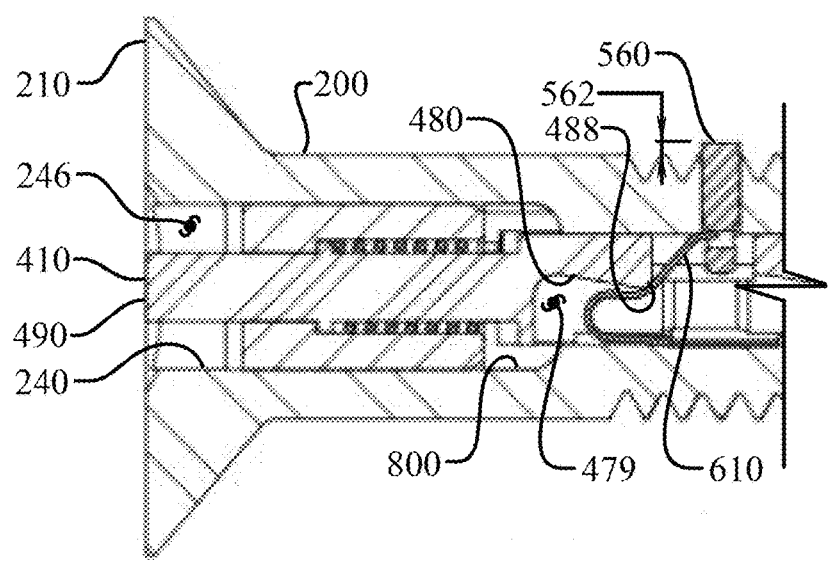
FIG. 12 is a partial cross-section view of an embodiment of a captive fastener, having an activator in a first position state.
Figure 13:
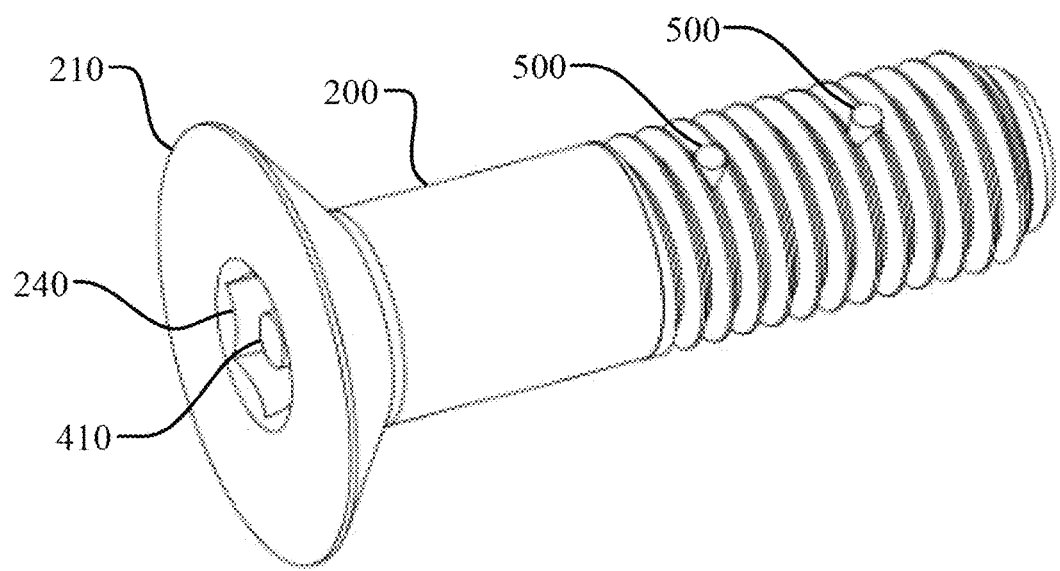
FIG. 13 is an isometric view of an embodiment of a captive fastener, having an activator in a second position state.

The locking pin (500) is moved between an extended position (560) and a retracted position (570). In the extended position (560) the locking pin (500) may be proud of the adjacent portion of the primary body (200) by a proud dimension (562), as seen in FIG. 12. However, it should be appreciated that the pin proximal end (510) need to extend all the way to the exterior surface of the primary body (200) in the extended position (560), but rather in some embodiments it is sufficient to have the pin proximal end (510) merely extend beyond the thread root to interfere with the thread pattern. Such cases have a root proud dimension measuring the greatest distance from the thread root to the pin proximal end (510). All disclosed dimensions and relationships relating to the proud dimension (562) apply equally to the root proud dimension.

The retracted position (570) is a position in which the pin proximal end (510) is below the root thread such that relative rotation of the primary body (200) and a secondary threaded body, such as a nut (1100), may occur. A retracted position (570) is shown in FIGS. 16 and 15. These figures illustrate a situation whereby a tool was inserted into the primary body (200), thereby depressing the actuator (400) and moving the locking pins (500) to a retracted position (570) so that relative rotation with a nut (1100) was possible, and then the tool was removed thereby allowing the actuator (400) to return to the actuator first position (490), and thereby allowing the locking pin (500) nearest the actuator proximal end (410) to return to the extended position (560) while the other locking pin (500) remained in the retracted position (570) because the threads of the nut (1100), only seen in FIG. 16, prevented this locking pin (500) from returning to the extended position (560). A pin position differential (590) is the travel distance of the locking pin (500) from the extended position (560) to the retracted position (570). In the illustrated embodiments the locking pins (500) are biased to the extended position (560), however they may be biased the opposite way, or not biased at all.

Figure 29:
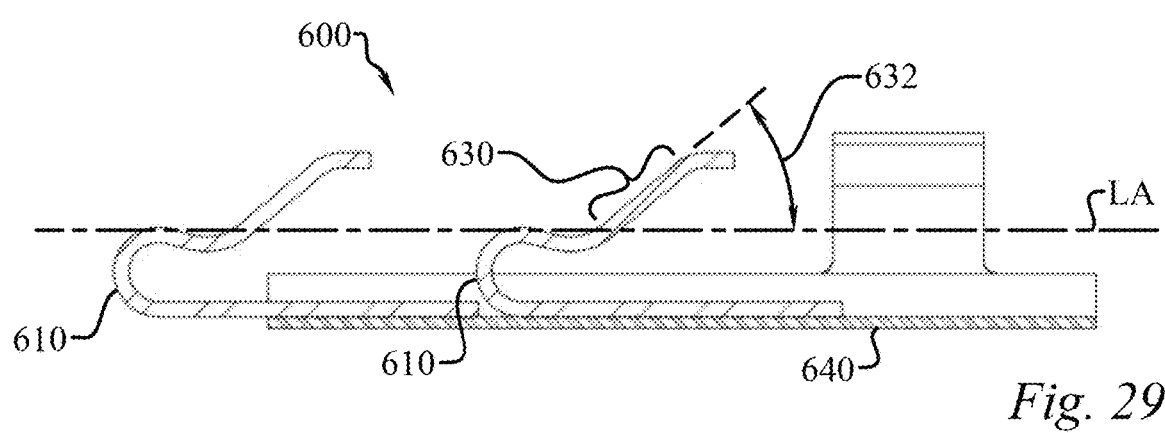
FIG. 29 is a cross-section view of an embodiment of a captive fastener biasing system.
Figure 30:
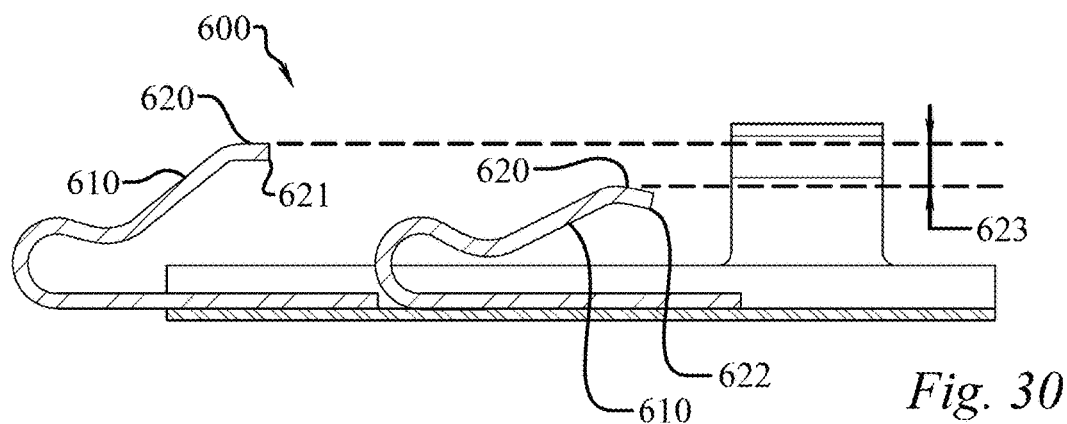
FIG. 30 is another cross-section view of an embodiment of a captive fastener biasing system.
Figure 31:
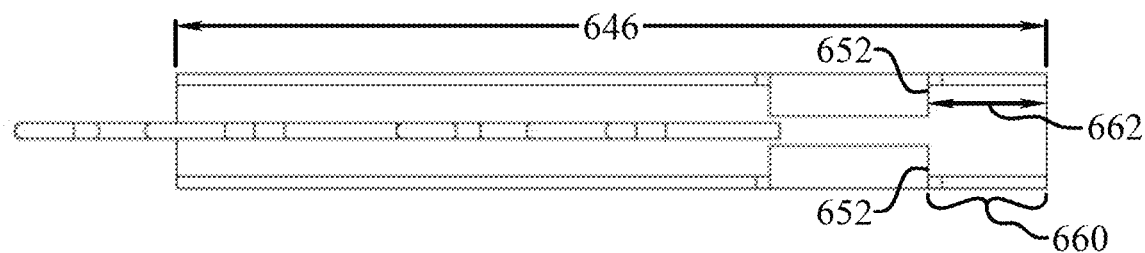
FIG. 31 is a top plan view of an embodiment of a captive fastener biasing system.
Figure 32:
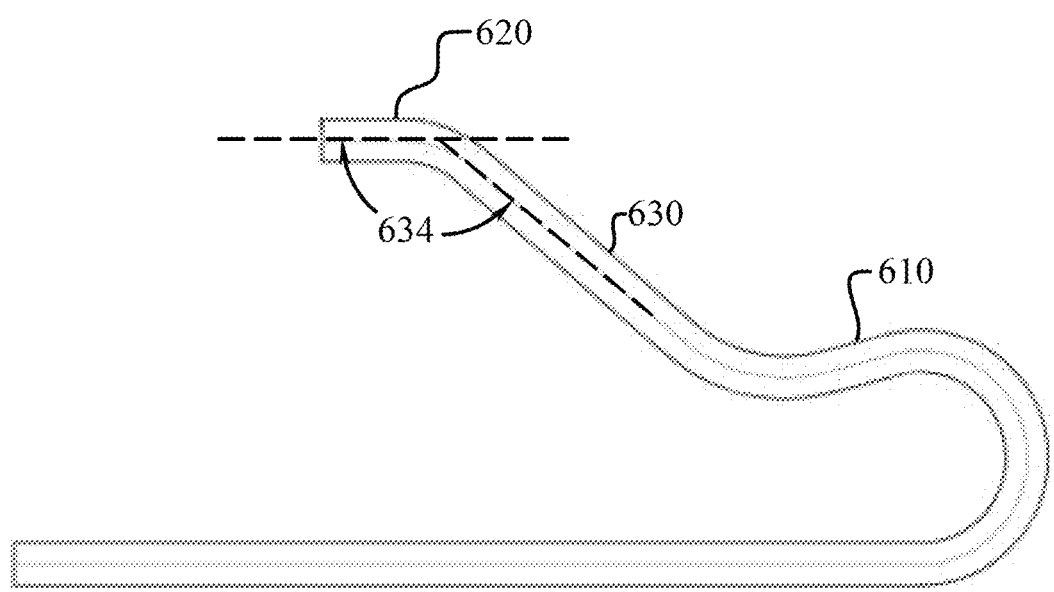
FIG. 32 is a side elevation view of an embodiment of a biasing member.
Figure 33:
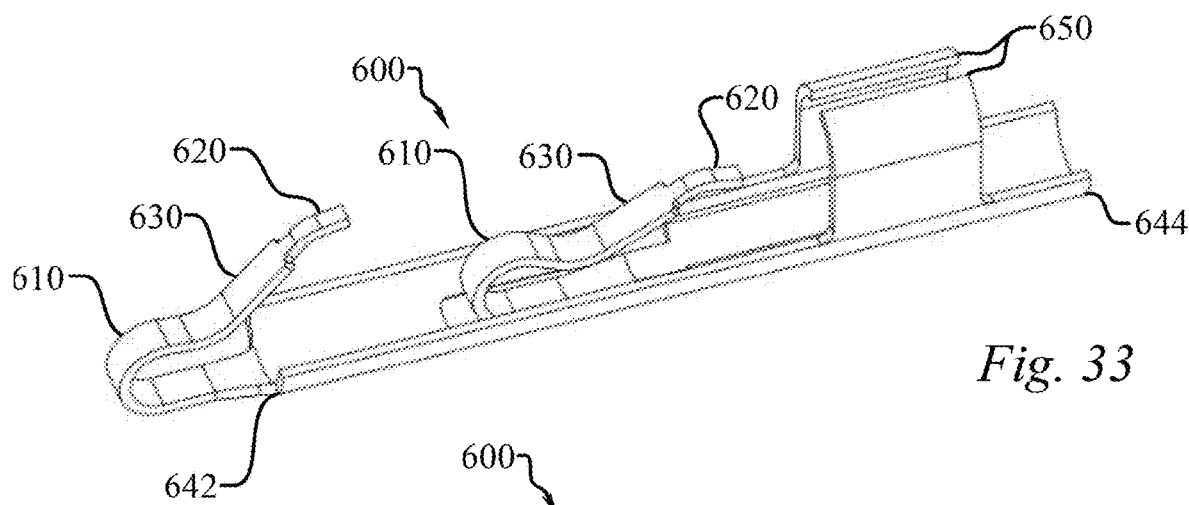
FIG. 33 is an isometric view of another embodiment of a captive fastener biasing system.
Figure 34:
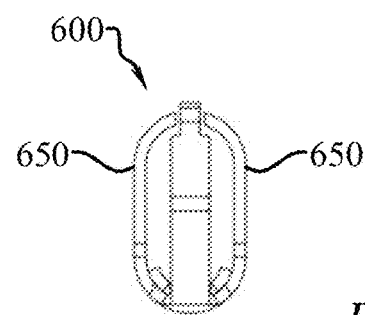
FIG. 34 is an end elevation view of another embodiment of a captive fastener biasing system.
Figure 35:
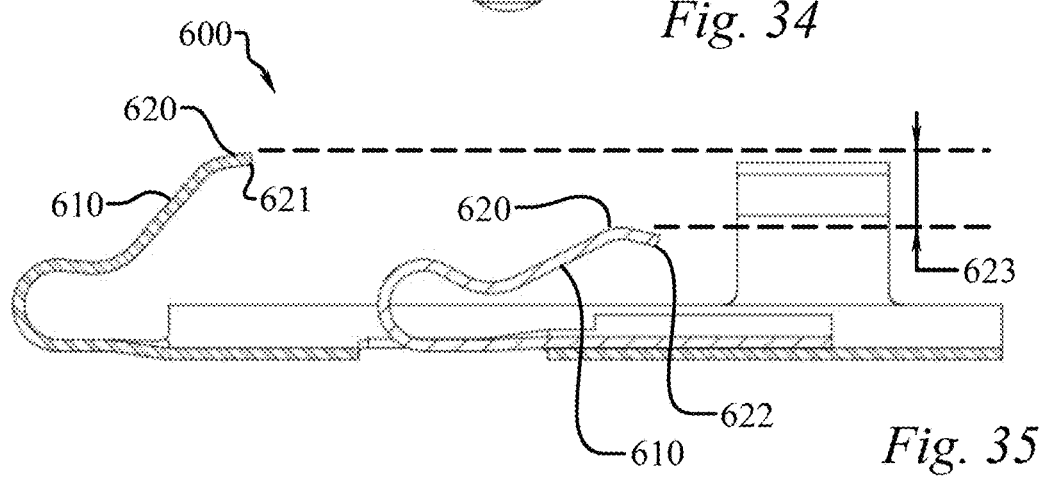
FIG. 35 is a cross-section view of another embodiment of a captive fastener biasing system.
Figure 36:
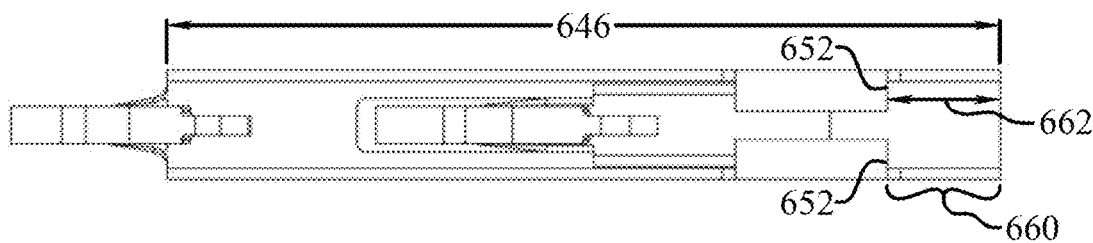
FIG. 36 is a top plan view of another embodiment of a captive fastener biasing system.
Figure 41:
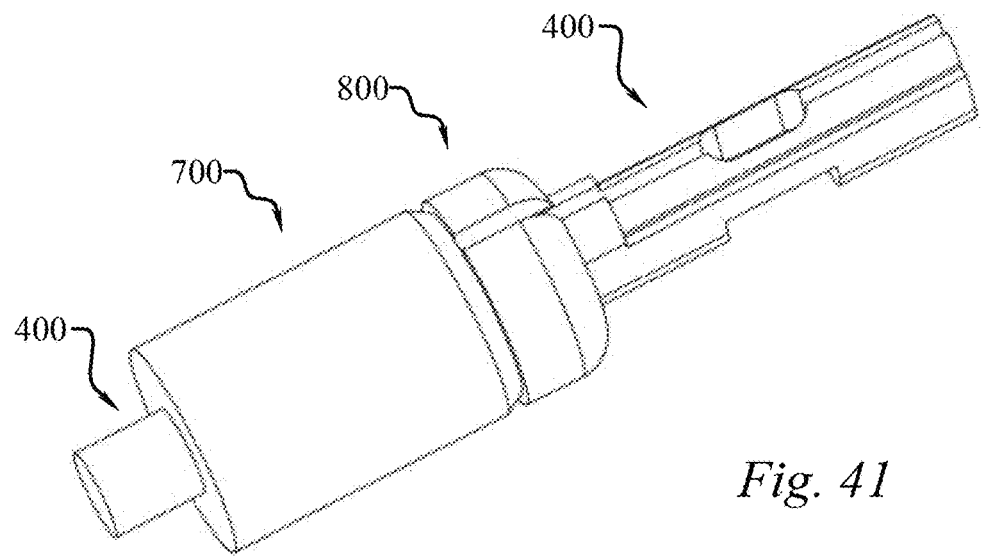
FIG. 41 is an isometric view of an embodiment of an actuator, bushing; and retainer.
Figure 42:
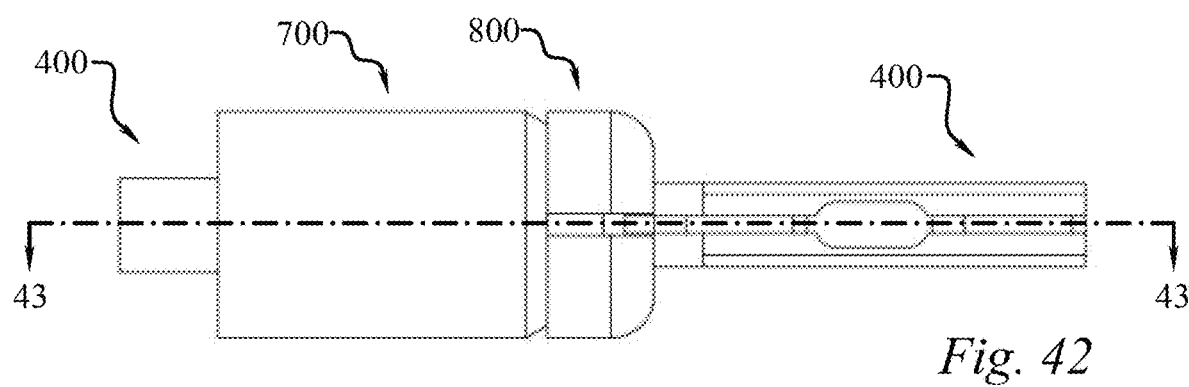
FIG. 42 is a top plan view of an embodiment of an actuator, bushing; and retainer.
Figure 43:
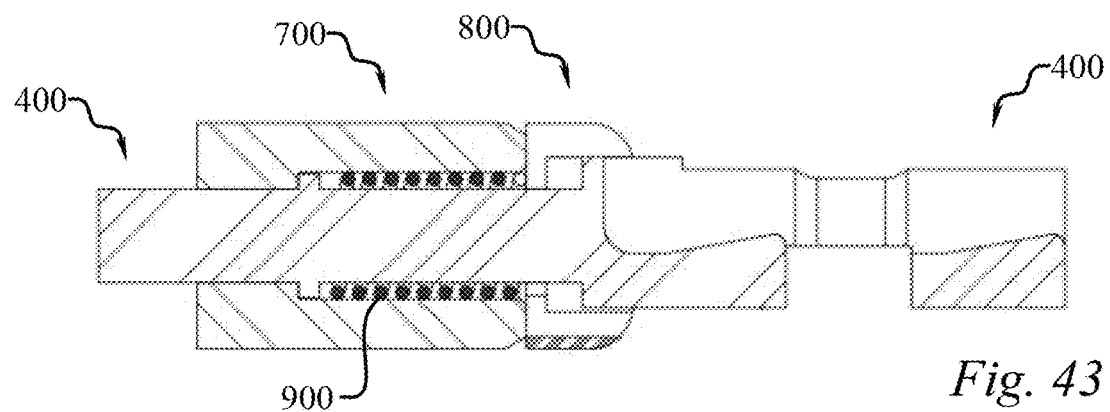
FIG. 43 is a cross-section view of an embodiment of an actuator, bushing; retainer, and actuator biasing member taken along section line 43-43 in FIG. 42.
Figure 44:
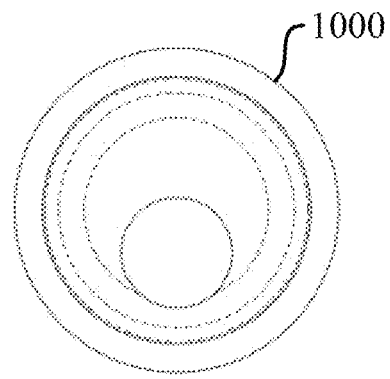
FIG. 44 is an end elevation view of an embodiment of a captive fastener cap.
Figure 45:
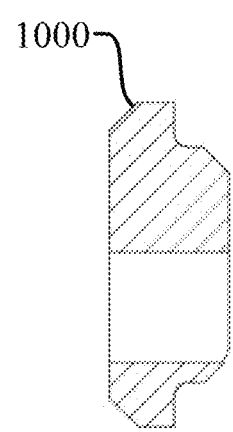
FIG. 45 is cross-section view of an embodiment of a captive fastener cap.

The biasing system (600) is illustrated in FIGS. 1-10 and 27-31 as including a biasing member (610) for each locking pin (500), with the biasing members (610) attached to a biasing member housing (640), however the biasing member (s) (610) may be integrally formed with the biasing member housing (640), as seen in FIGS. 33-36 and 15-16, and the biasing member housing (640) is not required in some embodiments. Focusing first on the embodiment illustrated in FIGS. 27-32, the biasing member (610) may be formed to have a pin engager (620) and an actuation surface (630) having an actuation surface length. The pin engager (620) is that portion of the biasing member (610) that cooperates with the receiver (550) of the locking pin (500), so that the biasing member (610) may move the locking pin (500), and/or vice versa. As seen in FIG. 30, the pin engager (620) is displaced from a first position (621) to a second position (622), thereby defining a position delta (623), upon engagement with the actuator (400). The biasing member (610) may include an actuation surface (630) at a surface angle (632) from the longitudinal axis (LA), as seen in FIG. 29, and an engager angle (634), as seen in FIG. 32. The biasing member (610) may include a spring in wire form bent, as seen in FIGS. 27-32, to have the characteristics and attributes described herein, or it may be a stamped spring configuration, as seen in FIGS. 33-36. In one embodiment the bent wire includes at least one 180 degree change in direction and at least one 20 degree change in direction, as seen in FIG. 29. In another embodiment the bent wire biasing member (610), or the stamped biasing member (610) seen in FIGS. 33-36, has at least two inflection points whereby in a side elevation view as oriented in FIG. 29 an inflection point is the location in which a curvature changes from convex to concave, or concave to convex.

Referring again to FIGS. 27-32, the biasing member housing (640) has a housing proximal end (642), a housing distal end (644), and a housing length (646). In the illustrated embodiment the biasing member housing (640) is configured such that throughout majority of the housing length (646) the housing (640) cooperates with the recess (476) of the actuator distal portion (470). The exterior of the housing (640) may be configured to cooperate with the shape of the exterior of the actuator distal portion (470), the shape of the recess (476), and/or the shape of the PB distal bore (250). In one embodiment all of these shapes cooperate to reliably position the components in a durable and repeatable manner. For instance in one embodiment the exterior of the housing (640), seen in FIG. 27, matches the PB distal bore minor dimension (258), seen in FIG. 17C, and associated curvature, and in a further embodiment is a semi-circle. Such positioning may further be enhanced via the incorporation of at least one bore engagement feature (650), seen in FIGS. 27-28, and the illustrated embodiment incorporates two bore engagement features (650) to further cooperate with the PB bore major dimension (256), seen in FIG. 17C. The at least one bore engagement feature (650) has an engagement feature length that is at least 10% of the housing length (646), seen in FIG. 31, and at least 20% in another embodiment, and 10-40% in still a further embodiment. Also seen in FIG. 31, the at least one bore engagement feature (650) creates a bearing surface (652) to abut the cap (1000), as seen in FIG. 15. Further, in some embodiments the housing (640) includes a cap engagement feature (660), having an engagement feature length (662), as seen in FIG. 31 and shown engaging the cap (1000) in FIG. 15, and preferably a cooperating recess within the cap (1000).

The embodiments of FIGS. 1-45 may further include a bushing (700), seen in FIGS. 1-10, and specifically in FIG. 37. The bushing (700) has a bushing proximal end (710), a bushing distal end (720), and a bushing length (730). The bushing (700) has an external shape to cooperate with the PB proximal bore (240), and has a bushing bore (740) through which a portion of the actuator (400) passes. As seen in FIG. 37, the bushing bore (740) may include a bushing proximal bore (750) and a bushing distal bore (760) of a different shape and/or dimension. The bushing proximal bore (750) has a bushing proximal bore dimension (752) and a bushing proximal bore length (754); and likewise the bushing distal bore (760) has a bushing distal bore dimension (762) and a bushing distal bore length (764). The change in shape and/or dimension occurs at a bore transition (770), which in one embodiment cooperates with the stop (466) of the actuator proximal portion (460). In one embodiment the bushing distal bore length (764) is greater than the bushing proximal bore length (754), and/or the bushing distal bore dimension (762) is greater than the bushing proximal bore dimension (752). An actuator biasing member (900) may fit within the bushing distal bore (760), as seen in FIGS. 1-10, to bias the actuator (400).

The captive fastener (100) may further include a retainer (800) within the PB proximal bore (240), as seen in FIGS. 1-10, 12, and 14, and specifically in FIGS. 38-40. The retainer (800) is configured to limit the motion of the actuator (400), and is sized to allow passage of the actuator proximal portion (460) but not the actuator distal portion (470). As seen in FIGS. 38-40, the retainer (800) has a retainer proximal end (810), a retainer distal end (820), and a retainer length (830). The retainer (800) has a retainer bore (840), which may be divided into a retainer proximal bore (850) and a retainer distal bore (860). The retainer proximal bore (850) has a retainer proximal bore dimension (852) and a retainer proximal bore length (854), and likewise the retainer distal bore (860) has a retainer distal bore dimension (862) and a retainer distal bore length (864), which in one embodiment is greater than the retainer proximal bore length (854), and in a further embodiment is at least twice the retainer proximal bore length (854). The retainer (800) may be configured so that it is does not continuously surround the actuator (400), specifically having a first arm (880) and a second arm (890). The retainer (800) may further have a hinge region (870) to improve its secure fit such that the arms (880, 890) must be deflected for installation and naturally expand against the PB proximal bore (240) upon installation.

As illustrated in FIGS. 1-10, 15, and 44-45, the captive fastener (100) may further include a cap (1000) to close of the end of the PB distal bore (250). The cap (1000) may include a recess, or even an aperture, to receive a portion of the cap engagement feature (660). The captive fastener (100) may also include a nut (1100), seen in FIG. 16, configured to cooperate with the PB threaded region (270).

Now with basic structure of the various components described and defined, key relationships will be disclosed. As with all the relationships disclosed herein, these relationships are more than mere optimization, maximization, or minimization of a single characteristic or variable, and are often contrary to conventional design thinking yet have been found to achieve a unique balance of the trade-offs associated with competing criteria such as durability, weight, and ease of use. The aforementioned balance requires trade-offs among the competing characteristics recognizing key points of diminishing returns. In a captive fastener (100) proper functioning of each component on each and every engagement can be a matter of life or death. Therefore, this disclosure contains a unique combination of components and relationships that produce reliable operation of the components in designs that are adverse to fatigue and stress concentration failures. While the relationships of the various features and dimensions of a single component play an essential role in achieving the goals, the relationships of features across multiple components are just as critical, if not more critical, to achieving the goals, as will now be disclosed in detail. Further, the relative length, width, cross-sectional dimensions, thickness, and relative locations of various components, and their relationships to one another and the other design variables disclosed herein, influence the durability, ease of use, and strength of the captive fastener (100). Additionally, many embodiments have identified upper and/or lower limits ranges of relationships when extension outside the range the design, durability, and usability suffer.

In one such embodiment the actuator position differential (494), seen in FIG. 14, is at least as great as the pin position differential (590), seen in FIG. 15. In further embodiments the actuator position differential (494) is at least 10%, 20%, and 30% greater than the pin position differential (590), and in even further embodiments the actuator position differential (494) is no more than 300%, 250%, 200%, 150%, and 100% greater than the pin position differential (590). In another embodiment the pin position differential (590) is at least as great as the actuator position differential (494). In further embodiments the pin position differential (590) is at least 10%, 20%, and 30% greater than the actuator position differential (494), and in even further embodiments the pin position differential (590) is no more than 300%, 250%, 200%, 150%, and 100% greater than the actuator position differential (494).

Further, the actuator position differential (494), seen in FIG. 14, is less than 50% of the PB proximal bore length (242), seen in FIG. 17A, in an embodiment, and less than 40%, 30%, and 20% in further embodiments. However, in further embodiments the actuator position differential (494) is at least 5% of the PB proximal bore length (242), and at least 7.5%, 10%, and 12.5% in additional embodiments. Additionally, the actuator position differential (494), seen in FIG. 14, is less than 50% of the PB proximal bore dimension (244), seen in FIG. 17A, in an embodiment, and less than 40%, 30%, and 20% in further embodiments. However, in further embodiments the actuator position differential (494) is at least 5% of the PB proximal bore dimension (244), and at least 7.5%, 10%, and 12.5% in additional embodiments.

The travel of the locking pin (500) is also essential in the performance of the captive fastener (100). The pin position differential (590) is at least 20% of the thread depth of the threads in the PB threaded region (270) in one embodiment, and at least 30%, 40%, and 50% in further embodiments. However, another series of embodiments caps the relationship so that the pin position differential (590) is no more than 200% of the thread depth, and no more than 175%, 150% and 125% in further embodiments. Further, as previously explained, in some embodiments the locking pin (500) is proud of the external surface of the PB threaded region (270) by a proud dimension (562), seen in FIG. 12. In one embodiment the proud dimension (562) is no more than the pin dimension (580), seen in FIG. 26, and no more than 75% of the pin dimension (580) in another embodiment, and no more than 50%, 40%, and 30% in still further embodiments. However, another series of embodiments sets a floor in the relationship so that the proud dimension (562) is at least 10% of the pin dimension (580), and at least 15%, 20%, and 25% in additional embodiments. The proud dimension (562) is at least 10% of the thread depth of the threads in the PB threaded region (270) in one embodiment, and at least 15%, 20%, and 30% in further embodiments. However, another series of embodiments caps the relationship so that the proud dimension (562) is no more than 125% of the thread depth, and no more than 100%, 90% and 80% in further embodiments.

The configuration of the PB distal bore (250) also significantly influences the performance of the captive fastener (100). In fact, having a non-circular PB distal bore (250) throughout majority of the length of the PB threaded region length (272) provides the performance needed for the captive fastener (100); in another embodiment the disclosed non-circular PB distal bore (250) exists throughout at least 75% of the PB threaded region length (272), and in another embodiment the disclosed non-circular PB distal bore (250) exists throughout at least 100% of the PB threaded region length (272). In still a further embodiment the disclosed non-circular PB distal bore (250) exists throughout at least 100% of the PB threaded region length (272) and throughout at least 5% of the PB shank region length (282), and at least 10% and 15% in further embodiments. The extension into the PB shank region (280) also provides the benefit of moving the PB bore transition (260) away from the PB threaded region (270), thereby improving stress distribution. Incorporating a curved surface at the PB bore transition (260) further improves stress distribution, particularly when the radius of curvature of the PB bore transition (260) is within 50% of the radius of curvature associated with the PB distal bore minor dimension (258), as seen in FIG. 17C, and within 40% in another embodiment, and within 30% in still a further embodiment.

With reference to FIGS. 17B and 17C, the radius of curvature associated with the PB distal bore minor dimension (258) is at least 25% less than the radius of curvature associated with the PB proximal bore dimension (244), which in one embodiment is circular and therefore a diameter, meaning the associated radius of curvature is one-half the PB proximal bore dimension (244). In another embodiment the radius of curvature associated with the PB distal bore minor dimension (258) is at least 40% less than the radius of curvature associated with the PB proximal bore dimension (244), and at least 50% less in another embodiment. Another series of embodiments puts a floor on this relationship whereby the radius of curvature associated with the PB distal bore minor dimension (258) is at least 20% of the radius of curvature associated with the PB proximal bore dimension (244), and at least 25%, 30%, and 35% in further embodiments.

With reference to FIG. 17C, in one embodiment the PB distal bore major dimension (256) is at least 10% greater than the PB distal bore minor dimension (258), and at least 20%, 30%, and 40% greater in further embodiments. However, another series of embodiments caps this relationship such that the PB distal bore major dimension (256) is no more than 3 times the PB distal bore minor dimension (258), and no more than 2.5, 2.0, and 1.5 in further embodiments. The PB distal bore minor dimension (258) is no more than 90% of the PB proximal bore dimension (244) in one embodiment, and no more than 80%, 70%, and 60% in further embodiments. A further series of embodiments sets a floor on the relationship such that the PB distal bore minor dimension (258) is at least 25% of the PB proximal bore dimension (244), and at least 35%, 40%, and 45% in still further embodiments. Even further, the PB distal bore major dimension (256) is at least 5% less than the PB proximal bore dimension (244), and at least 10%, 15%, and 20% less in further embodiments. However, a further series of embodiments limits this relationship such that the PB distal bore major dimension (256) is at least 50% of the PB proximal bore dimension (244), and at least 60%, 70%, and 80% in additional embodiments.

Further, the pin bore dimension (310), the PB sidewall thickness (340), the pin bore offset (320), and PB distal bore dimension (254) significantly influence the performance of the captive fastener (100). The pin bore dimension (310) is less than the PB sidewall thickness (340) in one embodiment, and at least 10%, 20%, and 30% less in further embodiments. In another embodiment the pin bore offset (320) is at least 50% of the PB distal bore dimension (254), and at least 75%, 100%, and 125% in further embodiments.

The pin length (530) is greater than the PB sidewall thickness (340) in one embodiment, and at least 10%, 20%, and 30% greater in further embodiments. However, the pin length (530) is less than 90% of the PB threaded region dimension (274), and less than 80%, 70%, and 60% in additional embodiments. Further, the pin length (530) is no more than 7 times the pin dimension (580), and no more than 6 times, 5 times, and 4 times in additional embodiments. Additional embodiments set a floor to this relationship via the pin length (530) being at least 2 times the pin dimension (580), and at least 3 times, and 4 times, in further embodiments. Further, the receiver dimension (552) is less than the receiver offset (554), and at least 10%, 20%, and 30% less in additional embodiments. The receiver dimension (552) is less than 80% of the pin dimension (580) in an embodiment, and less than 70% and 60% in further embodiments. Additionally, the receiver offset (554) is at least 50% of the pin dimension (580) in an embodiment, and at least 60% and 70% in further embodiments.

The captive fastener (100) includes at least one locking pin (500), and at least two in some embodiments, such as those illustrated in FIGS. 1-45, and at least 3 and 4 in still further embodiments. In such embodiments having multiple locking pins (500), a pin separation distance between adjacent locking pins (500) is at least twice the pin dimension (580), and at least 3 times and 4 times in additional embodiments; however, the pin separation distance is no more than 8 times the pin dimension (580) in an embodiment, and no more than 7 times and 6 times in still further embodiments.

With reference to FIG. 17A, the integrity of the primary body (200) is essential to the performance of the captive fastener (100). In one embodiment the PB distal bore length (252) is greater than the PB proximal bore length (242), and at least 10% greater than 20% greater in further embodiments. Another series of embodiments caps this relationship such that the PB distal bore length (252) is no more than 100% greater than the PB proximal bore length (242), and no more than 90% and 80% in additional embodiments. In another embodiment the PB threaded region length (272) is greater than the PB shank region length (282), which is greater than the PB head region length (292). In embodiments having a PB head region (290), the PB head region dimension (294) is at least 10% greater than the PB shank region dimension (284), and at least 20% and 30% greater in additional embodiments. Another series of embodiments caps this relationship whereby the PB head region dimension (294) is no more than 3 times the PB shank region dimension (284), and no more than 2.5 times and 2.0 times in additional embodiments.

The actuator distal portion length (472) is preferably within 40% of the actuator proximal portion length (462), and within 30% and 20% in further embodiments. Additionally, the travel opening length (442) is at least 10% of the actuator distal portion length (472), and at least 20% and 30% in further embodiments. However, another series of embodiments caps the relationship so that the travel opening length (442) is no more than 60% of the actuator distal portion length (472), and no more than 50% and 40% in further embodiments. The retraction slot length (452) is at least 10% of the actuator distal portion length (472), and at least 20% and 30% in further embodiments. However, another series of embodiments caps the relationship so that the retraction slot length (452) is no more than 60% of the actuator distal portion length (472), and no more than 50% and 40% in further embodiments. Further, the travel opening width (444) is no more than 90% of the actuator distal portion dimension (474), and no more than 80% and 70% in further embodiments. However, another series of embodiments introduces a floor to the relationship whereby the travel opening width (444) is at least 40% of the actuator distal portion dimension (474), and at least 50% and 60% in further embodiments. Further, the retraction slot width (454) is no more than 90% of the actuator distal portion dimension (474), and no more than 80% and 70% in further embodiments. However, another series of embodiments introduces a floor to the relationship whereby the retraction slot width (454) is at least 40% of the actuator distal portion dimension (474), and at least 50% and 60% in further embodiments.

Additionally the characteristics of the biasing member pathway (479), seen best in FIGS. 20-24, play an important role in the performance of the captive fastener (100). The pathway length (479L) is at least 60% of the actuator distal portion length (474) in one embodiment, and is at least 70% and 80% in further embodiments. The pathway width (479W) is no more than 60% of the actuator distal portion dimension (474) in one embodiment, and no more than 50% and 40% in further embodiments. An additional series of embodiments establish a floor to this relationship with the pathway width (479W) being at least 5% of the actuator distal portion dimension (474) in one embodiment, and at least 10% and 15% in further embodiments. The recess depth (478) is less than the pathway width (479W), and at least 5% less and 10% less in further embodiments. In another embodiment the actuator proximal portion dimension (464) is greater than the actuator distal portion minor dimension (475), and less than the actuator distal portion major dimension (473).

Further, in another embodiment designed to reduce the likelihood of damage to the captive fastener (100), the only opportunity for engagement of a tool to rotate the captive fastener (100) is via a plurality of tool engagement surfaces (246) formed in the PB proximal bore (240), as seen in FIGS. 12 and 14. Therefore, insertion of a tool into the PB proximal bore (240) must result in displacement of the actuator (400) and movement of the locking pin (500) to a retracted position (570) so that it is safe to rotate the captive fastener (100) without causing damage. In one embodiment the tool engagement surfaces (246) have a longitudinal length that is greater than the actuator position differential (494). The pathway depth (479D) is at least 20% of the PB distal bore dimension (254), and/or the PB distal bore major dimension (256), in one embodiment, and at least 30% and 40% in further embodiments. Another series places a ceiling on this relationship with the pathway depth (479D) being no more than 80% of the PB distal bore dimension (254), and/or the PB distal bore major dimension (256), in one embodiment, and no more than 70% and 60% in additional embodiments.

The cam (480) plays a key role in the performance of the captive fastener (100). The cam length (482) is at least 25% of the actuator distal portion length (472) in one embodiment, and is at least 35% and 45% in further embodiments. Additionally, the cam length (482) is less than the travel opening length (442) in an embodiment. The cam angle (484) is at least 2.5 degrees in one embodiment, and at least 5, 7.5, and 10 degrees in additional embodiments. A series of additional embodiments caps the relationship such that the cam angle (484) is no more than 45 degrees in an embodiment, and no more than 35 and 25 degrees in further embodiments. The disclosed relationships facilitate an embodiment in which the pin position delta (623) is greater than the cam drop (486), and is at least 10% greater and 20% greater in additional embodiments.

Additionally, the bushing (700) provides additional shear strength required by the captive fastener (100). The bushing length (730) is at least 40% of the PB proximal bore length (242), and at least 50% and 60% in further embodiments. An additional series of embodiments places a ceiling on this relationship with the bushing length (730) not exceeding 90% of the PB proximal bore length (242), and no more than 80% and 70% in further embodiments. The bushing distal bore length (764) is no more than 5 times the bushing proximal bore length (754) in one embodiment, and no more than 4 times in another embodiment, and no more than 3 times in still a further embodiment. Further, the bushing distal bore dimension (762) is no more than 50% greater than the bushing proximal bore dimension (752) in one embodiment, and no more than 40% greater and 30% greater in further embodiments. As seen in FIGS. 39 and 12, the retainer proximal end (810) provides a bearing surface for the actuator biasing member (900). In one embodiment the retainer length (830) is less than 50% of the PB proximal bore length (242), and less than 40% and 30% in further embodiments. The retainer distal end (820) may transition with a radius to the exterior sidewalls, and the curved transition shall cooperate with the curvature of the PB bore transition (260).

While not limited to the configuration and assembly sequence of FIGS. 1-10, such embodiments have benefits in terms of manufacturability, improved durability, and minimize the potential of damage associated with foreign object debris, or FOD. For instance in some embodiments the bushing (700) and cap (1000) are permanently attached to the primary body (200), thereby confining all components to the primary body (200). Such permanent attachment may be achieved by welding, brazing, soldering, press fitting, or adhesives, just to name a few joining techniques. Further, the actuator biasing member (900) limits the motion of the actuator (400) such that no matter the force applied to the actuator proximal end (410), the cam (480) cannot translate enough to deform the biasing member (610) to the degree that the locking pin (500) could be removed from the captive fastener (100). In other words, in one embodiment the actuator biasing member (900) has a fully compressed length that is at least 40% of the bushing distal bore length (764) such that in the embodiments of FIGS. 1-45 the cam (480) cannot contact the locking pin (500); while in another embodiment the fully compressed length that is at least 50% of the bushing distal bore length (764), and at least 60% in still a further embodiment. Limiting the movement of the cam (480) ensures it cannot deform the biasing member (610) to the point of ever freeing the locking pin (500) via the pin engager (620) coming out of the receiver (550). Further, the cam leading edge (488) may have a radius of curvature to reduce the likelihood of causing failure of the biasing member (610) while ensuring smooth operation and cooperation with the actuation surface (630). In one such embodiment the cam leading edge radius of curvature is at least 5% of the travel opening length (442), as seen in FIG. 20, and at least 10% in another embodiment. Further, in embodiments having wire biasing members (610) the cam leading edge radius of curvature is greater than the thickness of the wire, in one embodiment, and is 25% greater in another embodiment, and 45% greater in still a further embodiment.

Additionally, while the disclosure and FIGS. 1-45 illustrate embodiments in which the actuator (400) moves relative to a fixed biasing system (600), one skilled in the art will appreciate the disclosure to also cover the opposite scenario whereby the biasing system (600) moves relative to a stationary actuator (400). Further, all the disclosure relating to components and relationships of the embodiments of FIGS. 1-45 also apply to embodiments in FIGS. 46-71. The embodiments of FIGS. 46-71 have a receiver (550) in the form of a neck (556) that directly cooperates with the actuator (400), thus these illustrated embodiments have eliminated a separate biasing system (600) and bushing (700), and the actuator distal end (420) may physically exit the PB distal end (220). Thus, if a cap (1000) is incorporated, it is not permanently attached to the primary body (200).

Figures 53, 54:
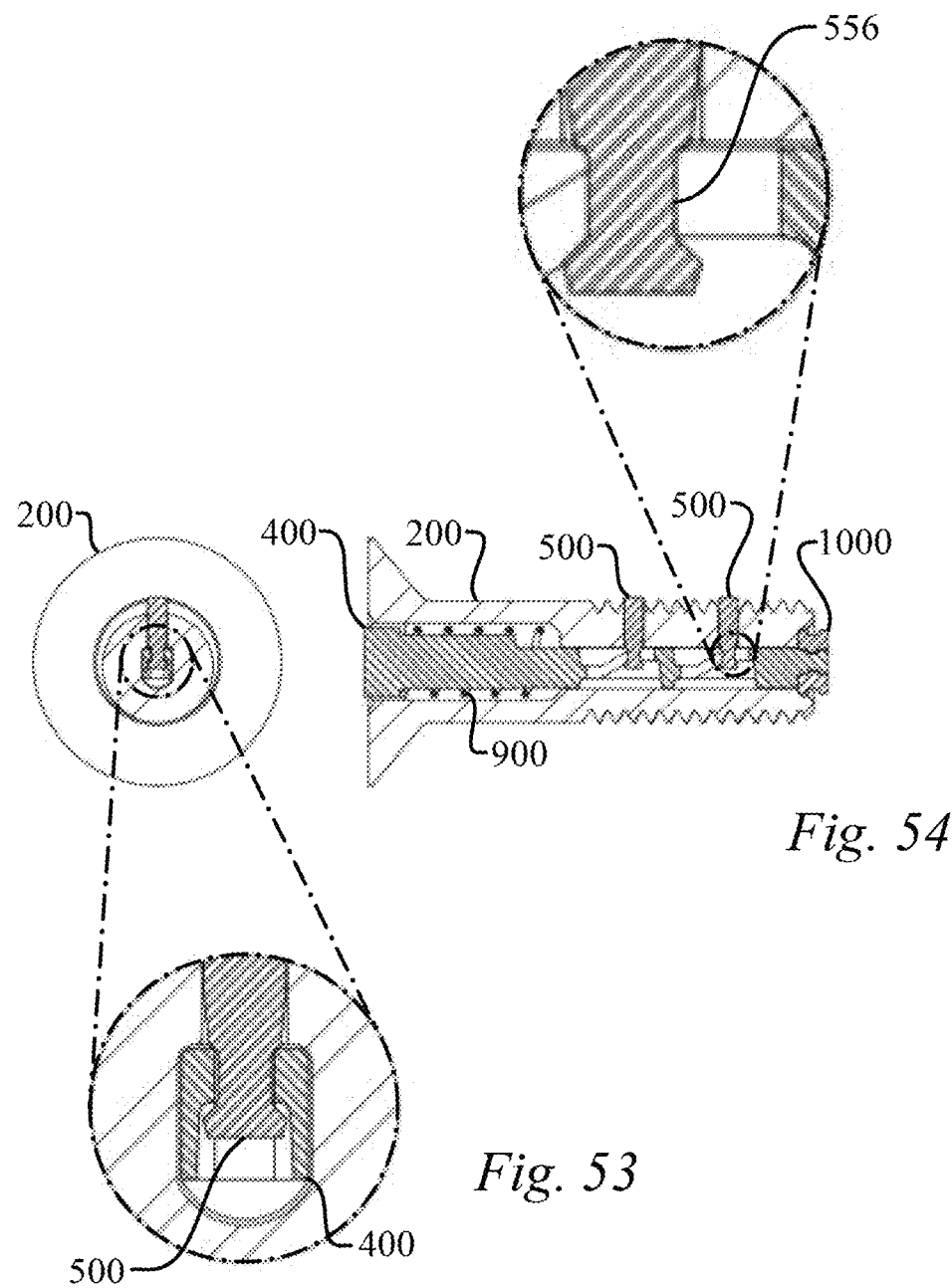
FIG. 53 is a cross-section view of an embodiment of a captive fastener taken along section line 53-53 of FIG. 52.
FIG. 54 is a cross-section view of an embodiment of a captive fastener taken along section line 54-54 of FIG. 51.
Figures 66, 67:
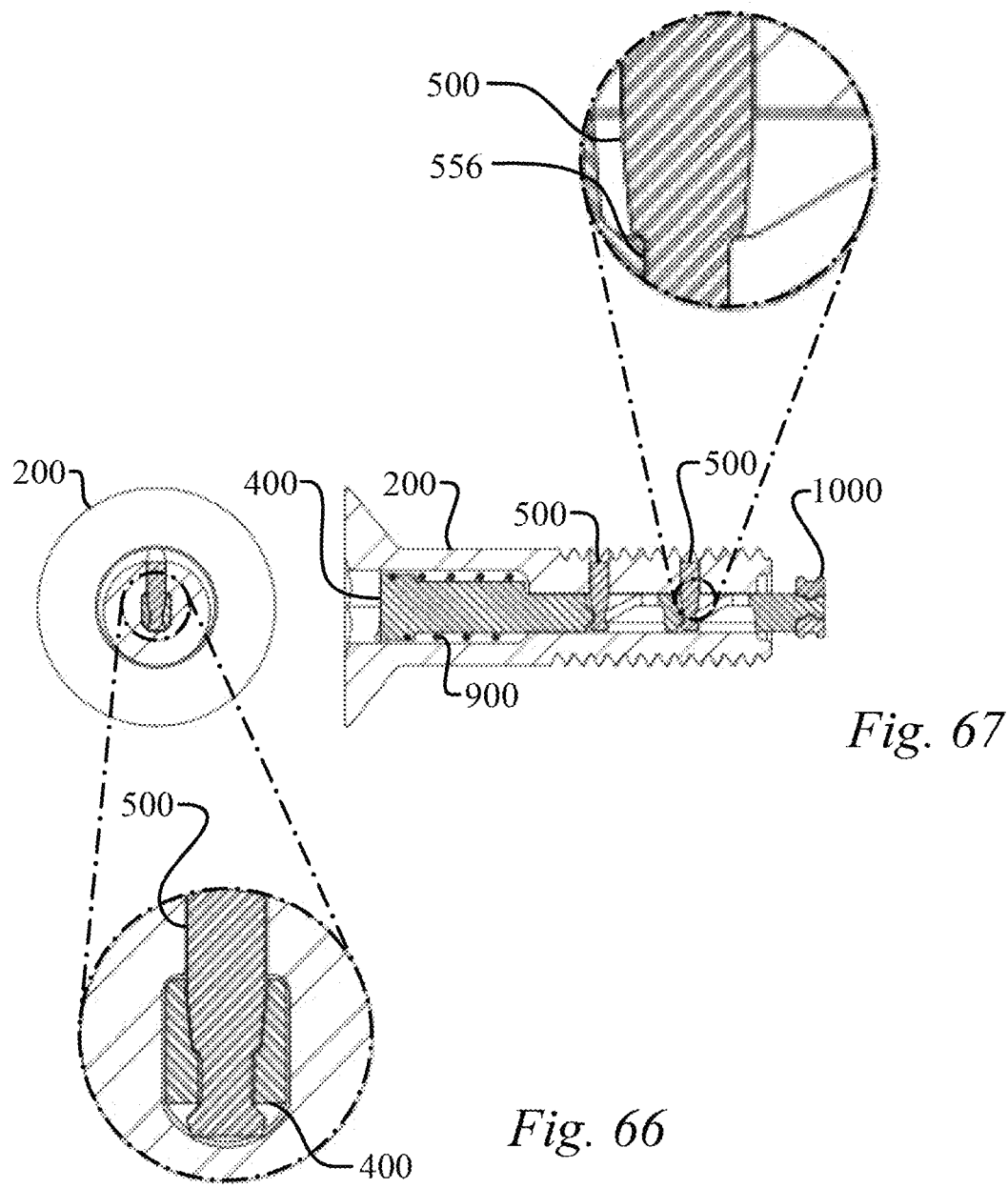
FIG. 66 is a cross-section view of an embodiment of a captive fastener taken along section line 66-66 of FIG. 65.
FIG. 67 is a cross-section view of an embodiment of a captive fastener taken along section line 67-67 of FIG. 64.
Figure 68:
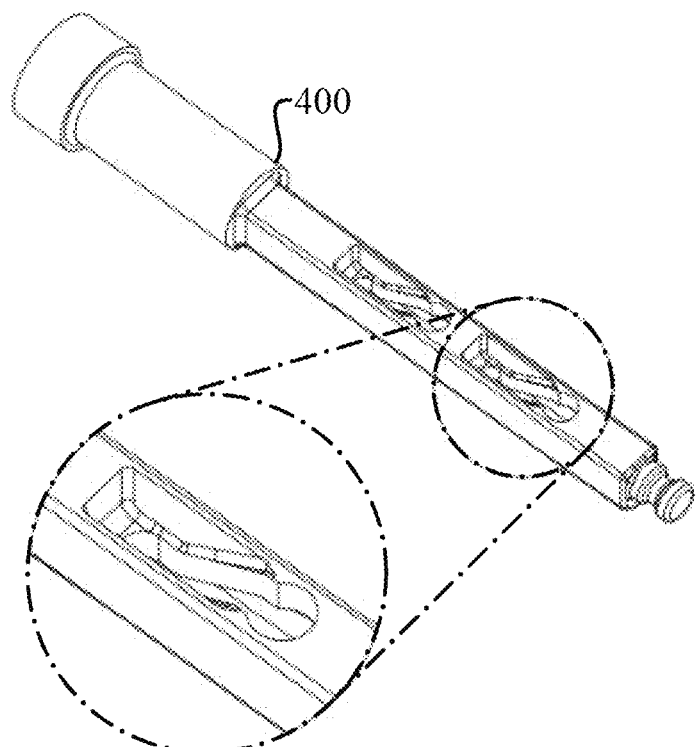
FIG. 68 is an isometric view of an embodiment of a captive fastener cam.
Figure 69:
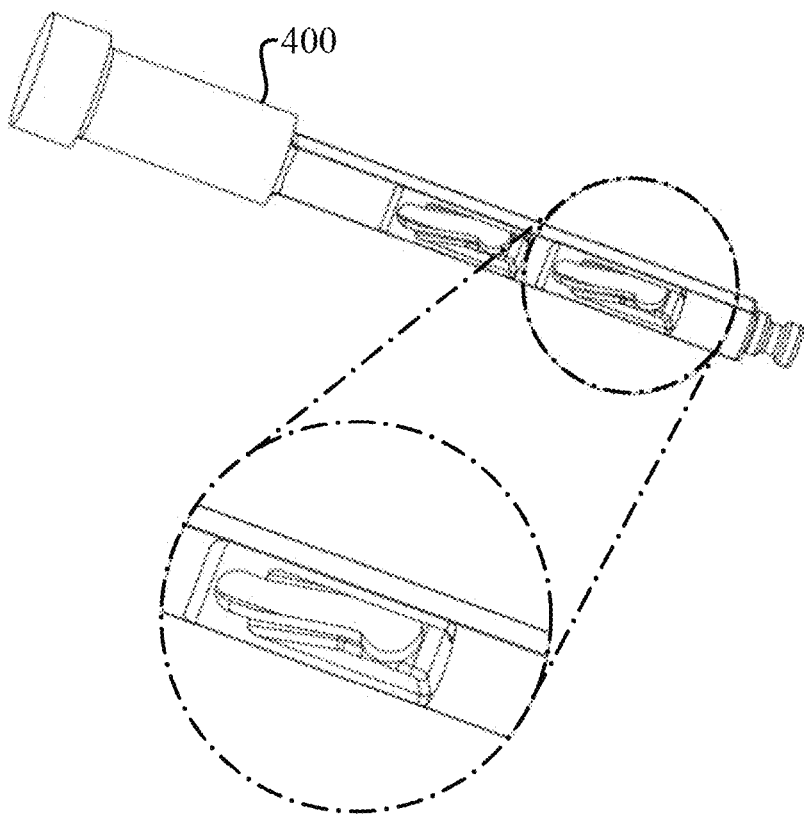
FIG. 69 is another isometric view of an embodiment of a captive fastener cam.
Figure 70:
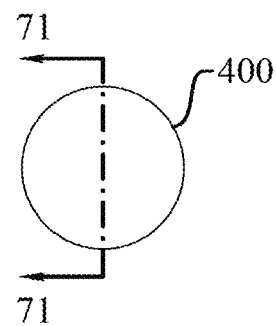
FIG. 70 is an end elevation view of an embodiment of a captive fastener cam.

As seen best in cross-sections of FIGS. 53, 60, and 66 illustrating the interaction of the actuator (400) and the neck (556) of the locking pin at three distinct locations of the actuator (400) within the primary body (200). For instance, notice the location of the ledges of the actuator, or the cam, that engage the neck (556) and control the movement of the locking pin (500) in these three cross-sections. In FIG. 53 the ledges are at the top of the cross-section of the actuator (400), or cam; in FIG. 60 the ledges are toward the middle of the cross-section of the actuator (400), or cam, and thus the locking pin (500) has been pulled inward; and in FIG. 66 the ledges are at the bottom of the cross-section of the actuator (400), or cam, and thus the locking pin (500) is in a fully retracted position. FIGS. 68-71 illustrate the camming ledges of the actuator (400) such that it is easy to appreciate the motion of the locking pin (500) described with respect to FIGS. 53, 60, and 66.

The material properties of the various components of the captive fastener are essential to the goals. In one embodiment the actuator (400) is formed of a material different than the primary body (200) and the locking pin (500), while in a further embodiment the actuator (400) is formed of a nonmetallic material while at least one of the primary body (200) an the locking pin (500) are formed of metallic materials. In one embodiment the actuator (400) is formed of a thermoplastic, while in a further embodiment it is formed of a polyetherimide (PEI) or a polyether ether ketone (PEEK). In another embodiment the nonmetallic material has a density of less than 2 g/cc and one, or more, of the following properties: a ASTM D638 tensile strength of at least 30 Ksi at 160° F., a ASTM D638 tensile modulus of at least 3500 Ksi at 160° F., a ASTM D695 compressive strength of at least 33 Ksi at 160° F., a ASTM D695 compression modulus of at least 1000 Ksi at 160° F., a ASTM D6272 flexural strength of at least 42 Ksi at 160° F., a ASTM D6272 flexural modulus of at least 2800 Ksi at 160° F., a ASTM D5379 shear strength of at least 11 Ksi at 160° F., and a ASTM D5961 bearing strength of at least 36 Ksi at 160° F. In a further embodiment the nonmetallic material has a density of less than 1.80 g/cc, and less than 1.60 g/cc, and less than 1.50 g/cc in additional embodiments. In one embodiment the nonmetallic material is a carbon fiber reinforced plastic material. In one embodiment the desirable strain relationships are achieved a polyamide resin, while in a further embodiment any of the disclosed nonmetallic materials may further include fiber reinforcement, and in yet another embodiment the nonmetallic material includes at least 35% fiber reinforcement. In one such embodiment the fiber reinforcement includes long-glass fibers having a length of at least 10 millimeters pre-molding and produce a finished actuator (400) having fiber lengths of at least 3 millimeters, while another embodiment includes fiber reinforcement having short-glass fibers with a length of at least 0.5-2.0 millimeters pre-molding. Incorporation of the fiber reinforcement increases the tensile strength of the actuator (400), however it may also reduce the elongation to break therefore a careful balance must be struck to maintain sufficient elongation. Therefore, one embodiment includes 35-55% long fiber reinforcement, while in an even further embodiment has 40-50% long fiber reinforcement. One specific example is a long-glass fiber reinforced polyamide 66 compound with 40% carbon fiber reinforcement, such as the XuanWu XW5801 resin having a tensile strength of 245 megapascal and 7% elongation at break. Long fiber reinforced polyamides, and the resulting melt properties, produce a more isotropic material than that of short fiber reinforced polyamides, primarily due to the three-dimensional network formed by the long fibers developed during injection molding. Another advantage of long-fiber material is the almost linear behavior through to fracture resulting in less deformation at higher stresses.

In one embodiment the density of the primary body (200) is no more than 8 g/cc, and no more than 6.8 g/cc in another embodiment, and the primary body (200) may have an elongation to break of at least 5%, at least 7%, 9%, 11%, 13%, and 14.5% in additional embodiments. The necessary strain and elongation requirements for durability must be balanced with the need for strength and durability in the connection. Traditional design practices of simply designing the components to be as strong as possible does not provide the needed durability of the captive fastener (100). In another embodiment the ultimate tensile strength is 754 and 960 MPa, and in another embodiment the melting point is less than 1350 degrees Celsius, while in a further embodiment the coefficient of thermal expansion is no more than 14 ($10^{-6}$/° C.), and the Young's Modulus is no more than 90 GPa in another embodiment, and the Ultimate Tensile Strength is no more than 1600 MPa in yet a further embodiment, and the Yield Strength is less than 150 MPa in still another embodiment.

In a still further embodiment the actuator (400) if formed of a nonmetallic material having a density of less than 2 g/cc and an elongation to break of at least 3% in one embodiment, and at least 4%, 5%, 6%, 7%, and 8% in further embodiments. In a further embodiment the nonmetallic material has a density of less than 1.80 g/cc, and less than 1.60 g/cc, and less than 1.40 g/cc, and less than 1.2 g/cc in additional embodiments. In an embodiment the nonmetallic material is a thermoplastic material, and a Polyetherimide (PEI) in a further embodiment, and, in still more embodiments, any of the following materials that meet the claimed mechanical properties: polycaprolactam, a polyhexamethylene adipinamide, or a copolymer of hexamethylene diamine adipic acid and caprolactam, however other embodiments may include polypropylene (PP), nylon 6 (polyamide 6), polybutylene terephthalates (PBT), thermoplastic polyurethane (TPU), PC/ABS alloy, PPS, PEEK, and semi-crystalline engineering resin systems that meet the claimed mechanical properties. In one embodiment the nonmetallic material has one, or more, of the following properties: a tensile strength of at least 20 Ksi, a tensile modulus of at least 1000 Ksi, a flexural strength of at least 30 Ksi, a flexural modulus of at least 900 Ksi, a compressive strength of at least 20 Ksi, a compressive modulus of at least 450 Ksi, a shear strength of at least 13 Ksi, and a Rockwell M scale hardness of at least 105.

In still another embodiment at least one of the following components are formed of a metallic material with a density of less than 4.6 g/cc in one embodiment, and less than 3 g/cc in yet another embodiment: the primary body (200), actuator (400), locking pin (500), biasing system (600), bushing (700), retainer (800), actuator biasing member (900), cap (1000), and nut (1100). In another embodiment the material has one, or more, of the following properties: an ultimate tensile strength of at least 68 Ksi, and at least 80 Ksi in anther embodiment; a tensile yield strength of at least 47 Ksi, and at least 70 Ksi in another embodiment; an elongation to break of at least 9% in one embodiment, and at least 11% in another embodiment, and at least 13%, 15%, 17%, and 19% in still further embodiments; and/or a modulus of elasticity of at least 9000 Ksi in one embodiment, and at least 10000 Ksi in another embodiment.

Some examples of metal alloys that can be used to form the components of the blind fastener include, without limitation, magnesium alloys, aluminum/aluminum alloys (e.g., 3000 series alloys, 5000 series alloys, 6000 series alloys, such as 6061-T6, and 7000 series alloys, such as 7075, just to name a few), titanium alloys (e.g., 3-2.5, 6-4, SP700, 15-3-3-3, 10-2-3, and other alpha/near alpha, alpha-beta, and beta/near beta titanium alloys, just to name a few), carbon steels (e.g., 1020 and 8620 carbon steel, just to name a few), stainless steels (e.g., A286, 301, 302, 303, 304 and 410 stainless steel), PH (precipitation-hardenable) alloys (e.g., 17-4, C450, and C455 alloys, just to name a few), copper alloys, and nickel alloys. In one embodiment the primary body (200) is formed of 17-4 PH stainless steel, the bushing (700) is high-yield 420 stainless steel, the retainer (800) is thermoplastic polyester elastomer, the locking pin (500) is a high-yield 420 stainless steel, the actuator (400) is a polyetherimide (PEI), the cap (1000) is A286 stainless steel, the actuator biasing member (900) is 304 stainless steel, and the biasing member (610) is high-yield 304 stainless steel.

Another embodiment tunes the galvanic compatibility of the components of the captive fastener, along with the previously disclosed balancing of relationships, to provide preferential galvanic compatibility. Thus, in one embodiment there is no more than a 0.50 V difference in the "Anodic Index" between any two of the components that come in contact with one another, while in another embodiment there is no more than a 0.25 V difference in the "Anodic Index" between any two of the components that come in contact with one another, and in yet another embodiment there is no more than a 0.15 V difference in the "Anodic Index" between any two of the components that come in contact with one another; per the galvanic data from MIL-STD-889.

Numerous alterations, modifications, and variations of the embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined herein.

We claim:

1. A captive fastener (100), comprising:
a primary body (200) having a PB proximal end (210), a PB distal end (220), a PB length (230), a PB threaded region (270) having a thread pattern including a thread root and a thread depth, a PB proximal bore (240) extending into the primary body (200) from the PB proximal end (210), a PB distal bore (250) having a longitudinal axis and extending into the primary body (200) from the PB distal end (220) and in communication with the PB proximal bore (240), a first pin bore located a first pin bore offset from the PB distal end (220) and extending from the PB distal bore (250) outward to a PB exterior surface thereby defining a first pin bore axis, a second pin bore located a second pin bore offset from the PB distal end (220) and extending from the PB distal bore (250) outward to the PB exterior surface thereby defining a second pin bore axis, wherein the PB proximal bore (240) has a PB proximal bore length (242), a PB proximal bore dimension (244), and a tool engagement surface (246), and the PB distal bore (250) has a PB distal bore length (252) and a PB distal bore dimension (254);
an actuator (400) housed within a portion of the PB proximal bore (240) and a portion of the PB distal bore (250), wherein the actuator (400) has an actuator proximal end (410) nearest the PB proximal end (210), an actuator distal end (420) nearest the PB distal end (220), an actuator length (430), an actuator proximal portion (460) extending an actuator proximal portion length (462) from the actuator proximal end (410) and having an actuator proximal portion dimension (464), an actuator distal portion (470) extending an actuator distal portion length (472) from the actuator distal end (420) and having an actuator distal portion dimension (474), a first cam having a first cam leading edge, and a second cam having a second cam leading edge, and formed with a biasing member pathway (479);
a first locking pin at least partially housed in the first pin bore and having a first pin proximal end, a first pin distal end, a first pin length between the first pin proximal end and the first pin distal end, and a first pin axis;
a second locking pin at least partially housed in the second pin bore and having a second pin proximal end, a second pin distal end, a second pin length between the second pin proximal end and the second pin distal end, and a second pin axis;
a biasing system (600) within the PB distal bore (250) and having a portion of the biasing system (600) within the biasing member pathway (479), wherein the biasing system (600) has a biasing member housing (640) having a first biasing member and a second biasing member, wherein the biasing member housing (640) has a housing proximal end (642), a housing distal end (644), and a housing length (646) between the housing proximal end (642) and the housing distal end (644), and wherein the first biasing member cooperates with the first pin to retain the first pin and bias the first pin away from the longitudinal axis to a FP extended position beyond the thread root and interfering with the thread pattern and the second biasing member cooperates with the second pin to retain the second pin and bias the second pin away from the longitudinal axis to a SP extended position beyond the thread root and interfering with the thread pattern;
a bushing (700) within the PB proximal bore (240) and having a bushing proximal end (710) nearest the PB proximal end (210) and at least partially recessed from the PB proximal end (210), a bushing distal end (720) nearest the PB distal end (220), a bushing length (730) between the bushing proximal end (710) and the bushing distal end (720), and a bushing bore (740) extending from the bushing proximal end (710) to the bushing distal end (720), wherein a portion of the actuator proximal portion (460) passes through the bushing bore (740);
an actuator biasing member (900) within the PB proximal bore (240) and engaging the bushing (700) and the actuator (400) to bias the actuator (400) toward the PB proximal end (210) and to an actuator first position (490);
wherein application of a predetermined force to the actuator proximal end (410) longitudinally displaces the actuator (400) from the actuator first position (490) to an actuator second position (492) nearer the PB distal end (220) thereby defining an actuator position differential travel distance (494) between the actuator first position (490) and the actuator second position (492);
wherein displacement of the actuator (400) from the actuator first position (490) to the actuator second position (492) forces the first cam leading edge against the first biasing member and retracts the first pin from the FP extended position to a FP retracted position that does not interfere with the thread pattern and defining a FP position differential, and forces the second cam leading edge against the second biasing member and retracts the second pin from the SP extended position to a SP retracted position that does not interfere with the thread pattern and defining a SP position differential; and
wherein the actuator biasing member (900) returns the actuator (400) to the actuator first position upon removal of the predetermined force allowing the first biasing member to bias the first pin away from the FP retracted position and the second biasing member to bias the second pin away from the SP retracted position.

2. The captive fastener (100) of claim 1, wherein the actuator position differential travel distance (494) is greater than the FP position differential, and the actuator position differential travel distance (494) is greater than the SP position differential.

3. The captive fastener (100) of claim 2, wherein the actuator position differential travel distance (494) is at least 10% greater than the FP position differential, and the actuator position differential travel distance (494) is at least 10% greater than the SP position differential.

4. The captive fastener (100) of claim 3, wherein the actuator position differential travel distance (494) is no more than 150% greater than the FP position differential, and the actuator position differential travel distance (494) is no more than 150% greater than the SP position differential.

5. The captive fastener (100) of claim 1, wherein the actuator position differential travel distance (494) is less than 50% of the PB proximal bore length (242).

6. The captive fastener (100) of claim 5, wherein the actuator position differential travel distance (494) is 5-30% of the PB proximal bore length (242).

7. The captive fastener (100) of claim 5, wherein the actuator position differential travel distance (494) is less than 50% of the PB proximal bore dimension (244).

8. The captive fastener (100) of claim 7, wherein the actuator position differential travel distance (494) is 5-30% of the PB proximal bore dimension (244), and the bushing length (730) is 40-90% of the PB proximal bore length (242).

9. The captive fastener (100) of claim 5, wherein the FP position differential is 20-200% of the thread depth, and the SP position differential is 20-200% of the thread depth.

10. The captive fastener (100) of claim 5, wherein in the FP extended position the first pin is proud of an external surface of the PB threaded region (270) by a FP proud dimension, in the SP extended position the second pin is proud of the external surface of the PB threaded region (270) by a SP proud dimension, the FP proud dimension is 10-75% of a first pin dimension that is the greatest cross-sectional dimension of the first pin taken perpendicular to the first pin axis, and the SP proud dimension is 10-75% of a second pin dimension that is the greatest cross-sectional dimension of the second pin taken perpendicular to the second pin axis.

11. The captive fastener (100) of claim 10, wherein the FP proud dimension is 10-80% of the thread depth, the SP proud dimension is 10-80% of the thread depth, and in the actuator first position (490) the actuator proximal end (410) extends beyond the bushing proximal end (710).

12. The captive fastener (100) of claim 1, wherein the PB proximal bore (240) has a PB proximal bore transverse cross-sectional shape taken in a plane perpendicular to the longitudinal axis, the PB distal bore (250) has a PB distal bore transverse cross-sectional shape taken in a plane perpendicular to the longitudinal axis, and the PB proximal bore transverse cross-sectional shape is different than the PB distal bore transverse cross-sectional shape.

13. The captive fastener (100) of claim 12, wherein at least one of the PB proximal bore transverse cross-sectional shape and the PB distal bore transverse cross-sectional shape is non-circular.

14. The captive fastener (100) of claim 13, wherein the PB distal bore length (252) is 10-100% greater than the PB proximal bore length (242), the PB distal bore (250) has a major dimension (256) and a minor dimension (258), the PB distal bore major dimension (256) is at least 10% greater than the PB distal bore minor dimension (258), the PB distal bore major dimension (256) is no more than 3 times the PB distal bore minor dimension (258), the PB distal bore minor dimension (258) is 25-90% of the PB proximal bore dimension (244), and the PB distal bore major dimension (256) is at least 50% of the PB proximal bore dimension (244).

15. The captive fastener (100) of claim 1, further including a retainer (800) within the PB proximal bore (240) and located between the bushing (700) and the PB distal end (220), the retainer (800) having a retainer bore (840) through which a portion of the actuator proximal portion (460) passes, wherein the retainer bore (840) is sized to prevent passage of the actuator distal portion (470), and the actuator biasing member (900) engages a portion of the retainer (800) and a portion of the actuator (400).

16. The captive fastener (100) of claim 1, further including a cap (1000) closing the PB distal bore (250) at the PB distal end (220), and abutting a portion of the biasing member housing (640).

17. The captive fastener (100) of claim 1, wherein the actuator (400) includes a travel opening (440) having a travel opening length (442) and a travel opening width (444), and the travel opening (440) receives a portion of the first locking pin and allows the actuator (400) to move longitudinally relative to the first locking pin without contacting the first locking pin or the second locking pin.

18. The captive fastener (100) of claim 17, wherein the first cam leading edge is formed in a wall of the travel opening (440), and the second cam leading edge is located at the actuator distal end (420).

19. The captive fastener (100) of claim 1, wherein the first biasing member biasing of the first pin away from the FP retracted position is independent of the second biasing member biasing of the second pin away from the SP retracted position, and the first locking pin is spaced apart from the second locking pin a pin separation distance between the first pin axis and the second pin axis, the first locking pin has a first pin dimension that is the greatest cross-sectional dimension of the first pin taken perpendicular to the first pin axis, and the second locking pin has a second pin dimension that is the greatest cross-sectional dimension of the second pin taken perpendicular to the second pin axis, and the pin separation distance is 3-8 times the first pin dimension and 3-8 times the second pin dimension.

20. The captive fastener (100) of claim 1, wherein the actuator (400) must be longitudinally displaced from the actuator first position (490) to engage the tool engagement surface (246), and wherein the bushing (700), the actuator biasing member (900), and the actuator (400) are configured so that the first cam leading edge cannot contact the first locking pin and the second cam leading edge cannot contact the second locking pin.

* * * * *